United States Patent
Bogos et al.

(10) Patent No.: US 9,593,967 B2
(45) Date of Patent: Mar. 14, 2017

(54) HIGH-RESOLUTION NON-CONTACTING MULTI-TURN SENSING SYSTEMS AND METHODS

(75) Inventors: Eugen Bogos, Lake Elsinore, CA (US); Perry Wehlman, Corona, CA (US); Christopher Couch, San Dimas, CA (US)

(73) Assignee: Bourns, Inc., Riverside, CA (US)

( * ) Notice: Subject to any disclaimer, the term of this patent is extended or adjusted under 35 U.S.C. 154(b) by 1113 days.

(21) Appl. No.: 13/550,167

(22) Filed: Jul. 16, 2012

(65) Prior Publication Data

US 2013/0015844 A1 Jan. 17, 2013

Related U.S. Application Data

(60) Provisional application No. 61/508,672, filed on Jul. 17, 2011.

(51) Int. Cl.
*G01R 33/06* (2006.01)
*G01D 5/244* (2006.01)

(52) U.S. Cl.
CPC .................. *G01D 5/24452* (2013.01)

(58) Field of Classification Search
CPC .. G01R 31/088; G01R 27/28; G01R 1/06772; G01R 29/0878; G01R 2021/6419; G01R 2035/103
USPC ....... 324/600, 637–647, 323, 337, 379, 250, 324/754.06, 754.31; 251/129.01–129.06, 251/30.02, 25
See application file for complete search history.

(56) References Cited

U.S. PATENT DOCUMENTS

| | | | | |
|---|---|---|---|---|
| 7,443,160 B2 * | 10/2008 | Wolf | ...................... | G01D 5/145 324/207.12 |
| 8,004,274 B2 * | 8/2011 | Budde | .................... | G01D 5/208 324/207.17 |
| 8,947,076 B2 * | 2/2015 | Bogos | ...................... | G01D 5/14 324/207.24 |
| 9,097,559 B2 | 8/2015 | Ronnat et al. | | |
| 2007/0281581 A1 * | 12/2007 | Rago | ........................ | A63H 1/24 446/242 |

(Continued)

FOREIGN PATENT DOCUMENTS

| | | |
|---|---|---|
| CN | 101802557 | 8/2010 |
| DE | 202009016539 | 5/2010 |

(Continued)

*Primary Examiner* — Melissa Koval
*Assistant Examiner* — Trung Nguyen
(74) *Attorney, Agent, or Firm* — Chang & Hale LLP

(57) ABSTRACT

Disclosed are systems and methods for measuring multi-turn position of a shaft with high resolution and in a non-contact manner. In some embodiments, a multi-turn sensing apparatus can include a rotation counter configured to determine a number of turns made by a shaft, and an angular position sensor configured to measure an angular position of the shaft within a given turn. The number of turns can be determined with an M-bit resolution, and the angular position per turn can be measured with an N-bit resolution. Selected appropriately, the rotation counter can be configured to operate as a relatively low resolution; and yet the multi-turn sensing apparatus can maintain the N-bit per-turn angular resolution throughout the full range. Accordingly, the multi-turn sensing apparatus can have an effective resolution of M+N bits.

15 Claims, 16 Drawing Sheets

(56) References Cited

U.S. PATENT DOCUMENTS

| | | | |
|---|---|---|---|
| 2011/0121824 A1 | 5/2011 | Sterling | |
| 2012/0146630 A1 | 6/2012 | Itomi | |
| 2012/0256619 A1 | 10/2012 | Muto et al. | |
| 2013/0076157 A1* | 3/2013 | Stein | A61F 2/442 307/116 |
| 2013/0218517 A1* | 8/2013 | Ausserlechner | G01B 7/30 702/151 |
| 2015/0070001 A1* | 3/2015 | Villaret | G01D 5/145 324/207.2 |

FOREIGN PATENT DOCUMENTS

| | | |
|---|---|---|
| JP | 2009-002827 A | 1/2009 |
| JP | 2011-058870 A | 3/2011 |
| WO | 03/069270 | 8/2003 |
| WO | 2009047401 | 4/2009 |
| WO | 2011/080935 | 7/2011 |

* cited by examiner

HIGH-RESOLUTION NON-CONTACTING MULTI-TURN SENSING SYSTEMS AND METHODS

CROSS-REFERENCE TO RELATED APPLICATIONS

This application claims the benefit of priority under 35 U.S.C. §119(e) of U.S. Provisional Application No. 61/508,672 filed on Jul. 17, 2011, which is incorporated herein by reference in its entirety.

BACKGROUND

Field

The present disclosure generally relates to the field of sensors, and more particularly, to systems and methods for multi-turn non-contact sensing with high-resolution.

Description of the Related Art

In many mechanical and/or electromechanical devices, it is desirable to accurately determine a state of a rotating object. For example, a rotating object such as a jackscrew imparts linear motion to another object by its rotation. In many situations, it is desirable to accurately determine the linearly moving object's location. Such determination can be based on knowing the angular position of the rotating object.

In some applications, it may be desirable to accurately determine the rotational position of the rotating object through a plurality of turns. Such a design typically suffers from relatively poor resolution and/or reliance on relatively complex mechanisms.

SUMMARY

In some implementations, the present disclosure relates to a position sensing device having a rotatable shaft having a longitudinal axis, a first sensor assembly, and a second sensor assembly. The first sensor assembly includes a first magnet and a first magnetic sensor. The first sensor assembly is configured to allow measurement of linear position of the first magnet relative to the first magnetic sensor so as to allow determination of a number of turns of the shaft. The second sensor assembly includes a second magnet and a second magnetic sensor. The second sensor assembly is configured to allow measurement of angular position of the second magnet relative to the second magnetic sensor so as to allow determination of angular position of the shaft within a given turn of the shaft, such that an angular resolution associated with the angular position of the shaft is substantially maintained throughout a plurality of turns of the shaft.

In some embodiments, the linear position of the first magnet can be along a linear direction having a component substantially parallel to the longitudinal axis. In some embodiments, the device can further include a first mechanism configured to couple the first sensor assembly to the shaft such that rotation of the shaft about the longitudinal axis results in linear motion of the first magnet along the linear direction.

In some embodiments, the device can further include a second mechanism configured to couple the second sensor assembly to the shaft such that rotation of the shaft results in rotational motion of the second magnet relative to the second magnetic sensor. The second mechanism can include a magnet holder configured to hold the second magnet and interconnect the second magnet to an end of the shaft. The second mechanism can be configured so that one turn of the shaft results one turn of the second magnet.

In some embodiments, the second magnet can be positioned so as to be non-contacting with the second magnetic sensor. The second magnet can include a bipolar and diametrally magnetized magnet configured to provide variable orthogonal and parallel magnetic fluxes to the second magnetic sensor.

In some embodiments, the second magnetic sensor can be configured to operate in quadrature mode. The second magnetic sensor include a plurality of Hall-effect sensors, a plurality of magneto-resistive (MR) sensors, or a plurality of giant magnetic resistive (GMR) sensors. The second magnetic sensor can include four sensors positioned in quadrature and configured to operate as sine-cosine sensors.

In some embodiments, the device can further include an analog interface configured to process output signals from the second magnetic sensor and yield digital data. By way of an example, the digital data can include information about the angular position of the shaft with a resolution of at least 10 bits for the given turn of the shaft. By way of a more specific example, the angular position of the shaft can have a resolution in a range of 10 bits to 14 bits for the given turn of the shaft. Other resolutions, higher or lower than the foregoing examples, can also be implemented.

In some embodiments, the second magnetic sensor and the analog interface can be parts of, or disposed on, an application specific integrated circuit (ASIC).

In some embodiments, the first sensor assembly can be configured to provide an M-bit resolution sufficient to count the number of turns, and the second sensor assembly is configured to provide an N-bit resolution to yield the angular resolution. Combined, the position sensing device can have an effective M+N bit resolution over the number of turns.

In some implementations, the present disclosure relates to a method for sensing a position of a shaft rotating about a longitudinal axis. The method includes determining a turn number of the shaft by a first magnet arranged in a non-contact manner with a first magnetic sensor to allow measurement of a linear position of the first magnet relative to the first magnetic sensor. The linear position is representative of the turn number of the shaft, with the turn number being determined with an M-bit resolution. The method further includes determining an angular position of the shaft within a given turn by a second magnet arranged in a non-contact manner with a second magnetic sensor, with the angular position within the given turn being determined with an N-bit resolution. The method further includes combining the turn number with the angular position to yield a measured position of the shaft within a range having a plurality of turns.

In some embodiments, the N-bit per turn angular position can be substantially maintained for the measured position throughout the range of plurality of turns. The combining can yield an effective resolution of M+N bits over the range of plurality of turns.

In some embodiments, the plurality of turns can include more than two turns. For example, the value of M can be selected to be 4 or less to allow determining of turn numbers up to 16.

In some implementations, the present disclosure relates to a multi-turn sensing apparatus that includes a shaft configured to rotate about a longitudinal axis. The apparatus further includes a rotation counter configured to determine a number of turns made by the shaft. The rotation counter includes a first magnet and a first magnetic sensor. The first magnet is coupled to the shaft and configured to move linearly along the longitudinal direction when the shaft is rotated. The first magnetic sensor is configured to sense the linear motion of the first magnet and determine the number of turns of the shaft in a non-contact manner. The apparatus further includes an angular position sensor configured to measure an angular position of the shaft for a given turn. The angular position sensor includes a second magnet and a second magnetic sensor. The second magnet is mounted to an end of the shaft and configured to rotate with the shaft. The second magnetic sensor is configured to sense the rotation of the second magnet and determine the angular position of the shaft in a non-contact manner.

In some implementations, the present disclosure relates to a non-contacting multi-turn sensing device having a first sensor and a second sensor. Each of the first and second sensors is configured as a non-contacting sensor. The first and second sensors are configured such that the device is capable of maintaining a selected angular position resolution within a range of zero to N turns of an object.

In some embodiments, the first sensor can be configured to allow determination of number of turns of the object, and the second sensor can be configured to allow determination of angular position of the object within a given turn. In some embodiments, the second sensor can be configured to determine the position of the object with the selected angular position resolution. In some embodiments, the selected angular position resolution can be at least 10 bits. In some embodiments, the selected angular position resolution can be 14 bits. In some embodiments, the first sensor can be configured with a 4-bit measurement range so as to yield an 18-bit effective angular resolution for the device over a range of 0 to 15 turns. Other resolutions, higher or lower than the foregoing examples, can also be implemented.

In some implementations, the present disclosure relates to a method for sensing rotation of a rotatable object. The method includes measuring a number of turns the object rotates. The method further includes measuring an angular position of the object within a range of zero to 360 degrees when the object has rotated by the number of turns. The measure further includes determining a total angular displacement of the object based on the number of turns and the angular position. The total angular displacement has an angular resolution substantially equal to that associated with the angular position measurement.

In some embodiments, the measurement of the number of turns can have an M-bit resolution, and the measurement of the angular resolution can have an N-bit resolution. The total angular displacement resolution can have an M+N bit resolution.

BRIEF DESCRIPTION OF THE DRAWINGS

These and other aspects, advantages, and novel features of the present teachings will become apparent upon reading the following detailed description and upon reference to the accompanying drawings. In the drawings, similar elements have similar reference numerals.

DETAILED DESCRIPTION OF SOME EMBODIMENTS

Disclosed herein are example embodiments of a high resolution non-contacting position sensing device. As described herein, such a sensing device can be designed and implemented in a cost effective manner. In some implementations, such a sensing device can be configured to operate as a multi-turn sensing device.

Figure 1:
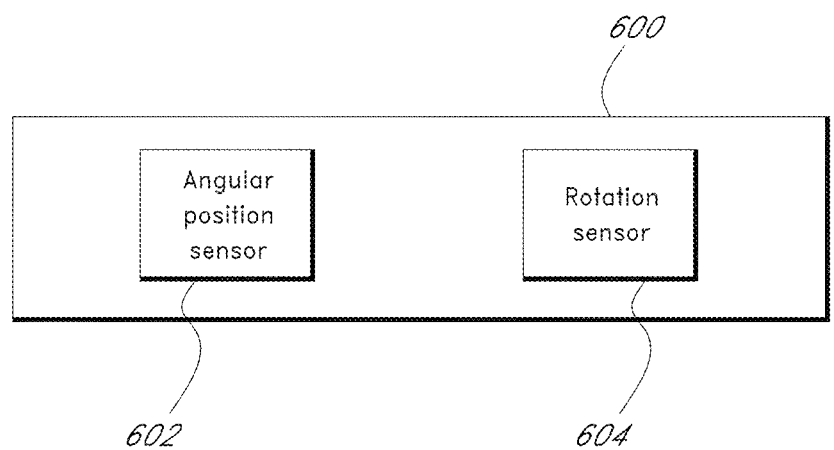
FIG. 1 schematically shows that in some implementations, a position sensing device can include an angular position sensor and a rotation sensor.

FIG. 1 schematically shows that in some implementations, a position sensing device 600 can include an angular position sensor component 602 and a rotation sensor component 604. In some implementations, the rotation sensor component 604 can be configured to operate in one or more ways as described in reference to FIGS. 2-18. Details concerning such a rotation sensor can also be found in U.S. Patent Application Publication No. 2011-0175601 (U.S. application Ser. No. 12/689,047, filed on Jan. 18, 2010), titled "HIGH RESOLUTION NON-CONTACTING MULTI-TURN POSITION SENSOR" which is expressly incorporated by reference in its entirety. FIGS. 19-23 show examples of how an angular position sensor component 602 can be combined with the rotation sensor component 604 to yield, among others, a high resolution capability over a range of rotation that can include multiple turns.

As described herein, a rotation sensor can be configured to provide advantageous features. For example, a rotation sensor can be configured to provide a multi-turn input capability, and the number of turns for such an input can be selected and programmed. Accordingly, rotational position resolution of the sensor can be adjusted from relatively coarse resolution to relatively high or fine resolution. In another example, a rotation sensor can be configured to provide such functionality with non-contacting arrangement between a sensing element and a sensed element. Accordingly, various mechanical issues typically associated with physically contacting configurations can be avoided.

In some embodiments, a rotation sensor can be configured to transform rotational motion of a rotating object (such as a shaft) into a translational motion of a sensed element. A sensing element can be provided and positioned relative to the sensed element so as to allow determination of the sensed element's translational position. In some embodiments, such translational position of the sensed element can correspond to a unique rotational position of the shaft.

Figure 2:
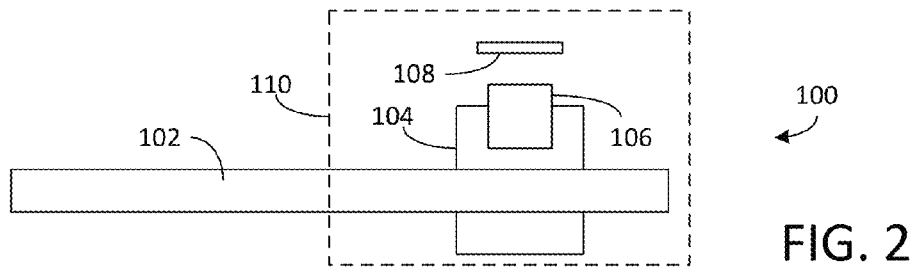
FIG. 2 schematically depicts an example embodiment of a rotation sensor.

FIG. 2 shows a rotation sensor 100 that can provide such a functionality. In some embodiments, some or all of the features associated with the rotation sensor 100 can be implemented in the rotation sensor component 604 of FIG. 1.

In some embodiments, the rotation sensor 100 can include a rotating object such as a shaft 102 mechanically coupled to a carrier 104. The mechanical coupling can be configured so that rotation of the shaft 102 translates to translational motion of the carrier 104. In some embodiments, such a translational motion of the carrier 104 can be a substantially linear motion along a direction substantially parallel to the rotational axis of the shaft 102.

In some embodiments, the mechanical coupling between the shaft 102 and the carrier 104 can include matching screw threads formed on the shaft 102 and on the inner surface of an aperture defined by the carrier 104. Additional details of an example of such threaded coupling are described herein.

In some embodiments, a lead value for the matching threads can be selected so as to provide a mechanical gear ratio between the rotation of the shaft 102 and the translation of the carrier 104. For the purpose of description herein, the term "pitch" may be used interchangeably with the term "lead" with an assumption that various example screw threads have single threadforms. It will be understood that one or more features of the present disclosure can also apply to screw threads having more than one threadforms. Thus, if appropriate in the description, distinctions between the two terms may be made.

As shown in FIG. 2, the rotation sensor 100 can further include a magnet 106 disposed on the carrier 104 so as to be moveable with the carrier 104. Additional details about different orientations of the magnet 106 relative to the translational motion direction are described herein.

As shown in FIG. 2, the rotational position sensor 100 can further include a sensing element 108 configured to sense the magnet 106 at various locations along the translational motion direction. Additional details about the sensing element 108 are described herein.

In some embodiments, the rotational position sensor 100 can also include a housing 110 to protect various components, facilitate mounting, etc. Additional details about the housing are described herein.

Figure 3A:
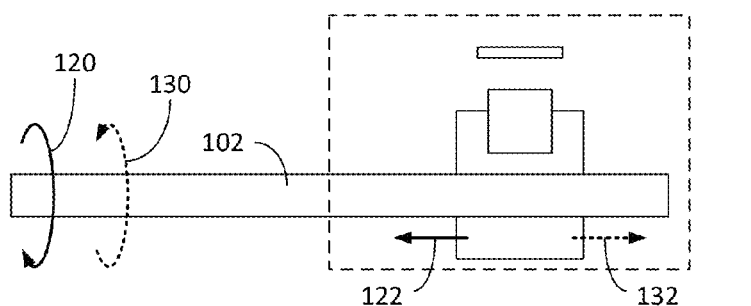
FIGS. 3A and 3B show that the rotation sensor of FIG. 2 can be configured to mechanically transform an input rotational motion to a range of translational motion of a sensed element such as a magnet whose translational position can be detected by a sensing element such as a magnetic field detector.
Figure 3B:
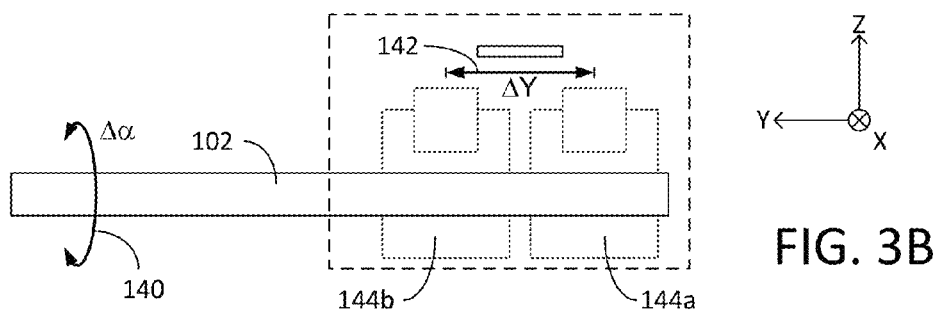

FIGS. 3A and 3B show that in some embodiments, rotation of the shaft 102 in a first direction (arrow 120) can result in the carrier 104 (and the magnet 106) moving linearly in a first direction (arrow 122), based on the mechanical gear ratio between the shaft 102 and the carrier 104. Rotation of the shaft in the opposite direction (arrow 130) can result in the carrier 104 (and the magnet 106) moving linearly in a second direction (arrow 132) that is opposite the first linear direction 122.

Based on such coupling of the shaft and the carrier, a range ($\Delta\alpha$) of rotational motion (indicated by arrow 140) of the shaft 102 can be made to correspond to a range ($\Delta Y$, indicated by arrow 142) of linear motion of the magnet 106 defined by two end positions (144$a$, 144$b$) of the carrier 104. In some embodiments, the linear motion of the carrier 104 and/or the magnet 106 can be constrained within the housing 110. Accordingly, the mechanical coupling between the shaft 102 and the carrier 104 can be selected such that the linear motion range ($\Delta Y$) corresponding to the rotational range ($\Delta\alpha$) of the shaft 102 is less than or equal to the mechanically constrained range of the carrier 104 and/or the magnet 106.

FIG. 3B shows an example coordinate system with "Y" representing the linear motion direction. It will be understood that the shown coordinate system is simply for the purpose of description and is not intended to limit the scope of the present disclosure in any manner.

Figure 4:
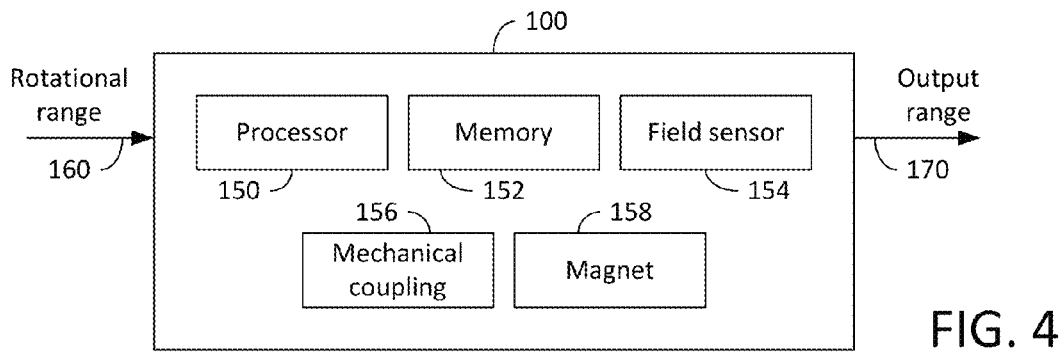
FIG. 4 schematically shows that in some embodiments, the rotation sensor can include a processor and a memory to facilitate a programmable capability.

FIG. 4 shows that in some embodiments, the rotation sensor 100 can include various functional components. As described in reference to FIGS. 2 and 3, a mechanical coupling component 156 can transform rotational movement of the shaft (102) into a linear movement of the magnet (106) that can be represented as a magnet component 158. Positions of the magnet can be detected by the sensor element (108) that can be represented as a field sensor component 154.

In some embodiments, the rotational position sensor 100 can also include a processor component 150 and a memory component 152 that can provide one or more functionalities as described herein. In some embodiments, the processor 150 and the memory 152 can provide programmable functionality with respect to, for example, calibration and operating dynamic range of the sensor 100.

As an example, such programmability can facilitate selection of a desired rotational range (depicted as an input 160); and a rotational position of the shaft within such a range can be provided with a unique output value that is within a selected output range (depicted as an output 170). Additional details about such programmability are described herein.

Figure 5A:
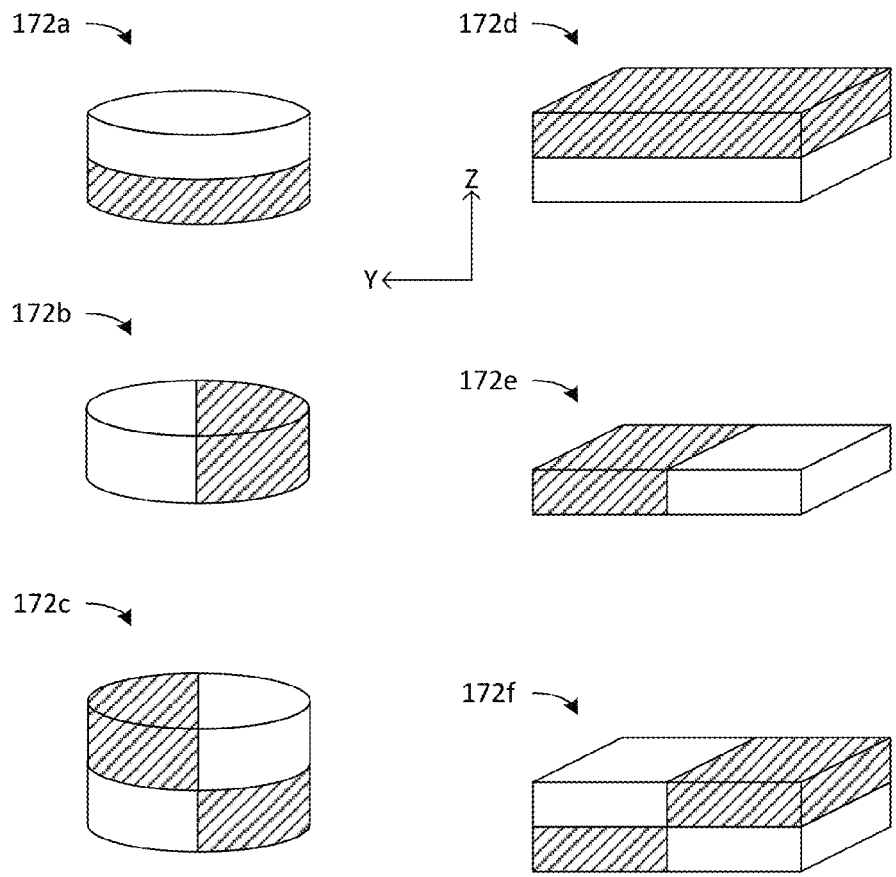
FIG. 5A shows non-limiting examples of magnet configurations that can be utilized for the magnet of FIG. 2.

In some embodiments, the magnet 106 depicted in FIGS. 2 and 3 can be configured in a number of ways. FIG. 5A depicts non-limiting examples of magnets that can be utilized in one or more embodiments of the rotation sensor 100 as described herein. For example, the magnet can be a cylindrical shaped magnet (172a, 172b, 172c) or some other shaped magnet such as a box shaped magnet (172d, 172e, 172f). For the purpose of description of FIG. 5A, it will be understood that the slanted line fill pattern and the unfilled pattern indicate two poles of a dipole magnet. For example, the unfilled pattern can represent a north pole, and the slanted line fill pattern can represent a south pole.

In some embodiments, the magnet 106 can be a permanent magnet. In some embodiments, the permanent magnet can be a single dipole magnet or a combination or two or more dipole magnets.

For the purpose of description herein, a permanent magnet can include a magnet that includes a material that is magnetized and generates its own substantially persistent magnetic field. Such materials can include ferromagnetic materials such as iron, nickel, cobalt, and certain rare earth metals and some of their alloys.

For the purpose of description herein, it will be understood that a single dipole magnet has what are generally referred to as "north" and "south" poles, such that magnetic field lines are designated as going from the north pole to the south pole. For the single dipole magnet, its magnetization axis is generally understood to be a line extending through the magnet's north and south poles.

For example, the example magnet 172a is a cylindrical shaped magnet having north and south poles along the cylinder's axis. In such a configuration, the magnetization axis can be approximately coaxial with the cylindrical axis.

In another example of a cylindrical shaped magnet 172b, the north and south poles are depicted as being azimuthal halves of the cylinder. Accordingly, its magnetization axis is likely approximately perpendicular to the cylindrical axis. In shaped magnets having two or more dipole magnets (e.g., 172c, 172f), a magnetization axis may or may not form relatively simple orientation with respect to the shape's axis. For the purpose of description herein, it will be understood that magnetization axis can include an overall characteristic of a magnet, as well as a local characteristic of a magnetic field pattern generated by a magnet.

In some examples described herein, magnetization axis is depicted as being generally perpendicular to the longitudinal motion of the magnet. However, it will be understood that other orientations of the magnetization axis are also possible. For example, magnet configurations 172b, 172c, 172e, and 172f can yield non-perpendicular magnetization axes when positioned as shown and moved along the indicated Y direction.

Figure 5B:
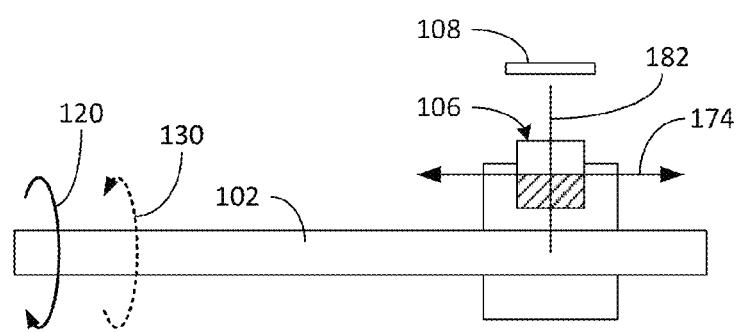
FIG. 5B shows that in some embodiments, the magnet can be a permanent dipole magnet positioned so that its magnetization axis is substantially perpendicular to the direction of the magnet's longitudinal motion.

FIG. 5B shows that in some embodiments, the magnet 106 can be a dipole magnet positioned so that its magnetization axis 182 is substantially perpendicular to the direction of the magnet's longitudinal motion (depicted as arrow 174). For example, a cylindrical permanent magnet can be positioned so that its north and south poles are generally form the magnetization axis 182 that is substantially perpendicular to the longitudinal direction. As described herein, such longitudinal motion can result from rotation (120, 130) of the shaft 102 to which the magnet 106 is coupled. As also described herein, such longitudinal motion can move the magnet 106 relative to the sensor element 108 so as to facilitate determination of the magnet's longitudinal position relative to the sensor element 108.

Figure 5C:
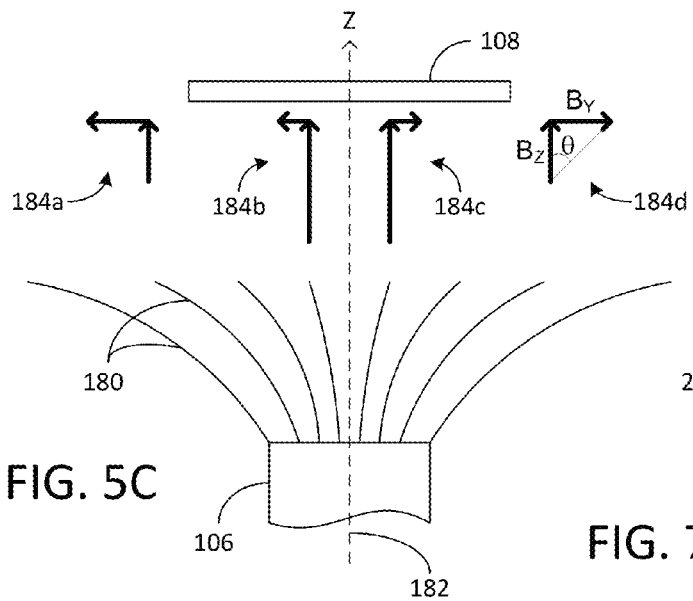
FIG. 5C shows that in some embodiments, the magnet can be oriented relative to its translational motion and the magnetic field detector such that its magnetic axis representative of the field pattern at or about the detector is generally perpendicular to the translational motion direction and generally normal to a plane defined by the magnetic field detector.

In the example shown in FIG. 5B, the magnetization axis 182 can be generally similar to the axis of the magnet's shape (e.g., a cylinder). An example shown in FIG. 5C depicts a more localized view of magnetic field lines 180 generated by the magnet 106. Although the magnet 106 depicted in FIGS. 5C-8B are described in the context of a dipole magnet such as that shown in FIG. 5B, it will be understood that a similar magnetic field pattern can be generated or approximated by other magnet configurations having one or more dipole magnets. Thus, the magnetization axis 182 depicted in FIG. 5C can be representative of a local field affecting the sensor element 108.

In some embodiments, the magnet 106 can be oriented such that its magnetization axis 182 representative of magnetic field at or about the sensor element 108 is generally perpendicular to the translational motion direction. In some embodiments, the magnet 106 can be positioned so that the magnetization axis and the longitudinal axis generally define a plane that extends through an approximate center of the sensor element 108. In the context of the example coordinate system shown in FIG. 3B, the magnetization axis of the magnet 106 is generally along the Z axis in such embodiments. As described herein, such a configuration can provide features that are desirable.

FIG. 5C shows a more detailed view of a pole section of the magnet 106 relative to a side view of the sensor element 108. As shown, the magnetization axis 182 of the magnet 106 is depicted as being generally perpendicular to a plane defined by the sensor element 108.

Also shown are depictions of magnetic field lines 180 generated by the magnet 106. Assuming that the shown pole is a magnetic north pole, several field vectors are depicted in their decomposed ($B_Z$ and $B_Y$) forms (in the example coordinate system shown in FIG. 3B). As shown, field vectors 184 are generally symmetrical about the magnetization axis 182. Thus, the Z component of the field vector 184a is generally same in direction and magnitude as the Z component of the field vector 184d; and the Y component of the vector 184a is opposite in direction but generally same in magnitude as the Y component of the vector 184d. Similarly, the field vector 184b is generally a mirror image of the field vector 184c.

Based on the foregoing, average contribution of $B_Z$ is generally symmetric about some Y=0 as the magnet moves along the Y direction. Such symmetry is depicted as a $B_Z$ curve 190 in FIG. 6A. If the $B_Z$ component alone is measured by the sensor element 108, then there may or may not be ambiguity in magnet's position determination. For example, if the sensor element 108 and the magnet 106 are configured so that the magnet's motion is limited to one longitudinal side of the sensor element, the measured $B_Z$ component may be that of the Y>0 portion of the curve 190. In such a situation, there is likely no ambiguity in position determination based on the $B_Z$ component alone. However, if the sensor element 108 and the magnet 106 are configured so that the magnet's motion is allowed on both longitudinal sides of the sensor element, there can be an ambiguity in position determination that can be resolved.

In some embodiments, magnetic field component along the translational motion direction ($B_Y$) can be measured simultaneously with the $B_Z$ component. Based on the example field representations 184 in FIG. 5C, the average contribution of $B_Y$ is generally asymmetric about some Y=0 as the magnet moves along the Y direction. Such asymmetry is depicted as a $B_Y$ curve 192 in FIG. 6B. Thus, the $B_Z$ ambiguity about Y=0 can be resolved by the asymmetry where $B_Y$>0 when Y>0 and $B_Y$<0 when Y<0.

In some embodiments, it is possible to characterize the magnet's position along the Y direction based on the values of $B_Y$ component. However, utilizing the $B_Z$ component can be advantageous for a number of reasons. For example, detection of perpendicular component (relative to a magnetic field detection plane) is usually preferred over other components. In another example, the $B_Y$ curve 192 passes through a zero value at Y=0. Thus, at Y=0 and near Y=0, the $B_Y$ component has a value of zero or a value that is relatively small. Consequently, signal-to-noise ratio can be unacceptably low at what can be a mid-portion of the magnet's travel along the Y direction. In contrast, the $B_Z$ component has a maximum value at generally the same mid-portion of the magnet's travel along the y direction. Further, the maximum value of the $B_Z$ component can be typically significantly higher than the maximum value of the $B_Y$ component.

In addition to the foregoing features, there are other considerations for which the example magnet orientation of FIG. 5C can provide advantageous features. Such features can include relative insensitivity of the output (170 in FIG. 4) to various deviations in the magnet's orientation.

Figure 7A:
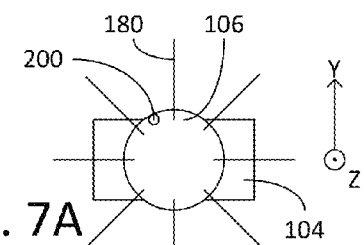
FIGS. 7A and 7B show that the example magnet orientation of FIG. 5 provides substantial symmetry of the magnet about its magnetic axis so as to reduce sensitivity in alignment of the magnet with respect to the magnetic field detector.
Figure 7B:
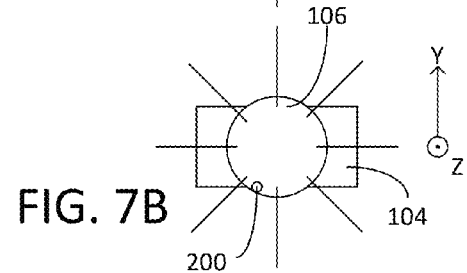

FIGS. 7A and 7B show the magnet 106 mounted on the carrier 104, and viewed along the magnetization axis. For such an example configuration, mounting can be achieved by the carrier 104 defining a recess (262 in FIG. 9) shaped similar to at least a portion of the magnet 106 (e.g., cylindrical shaped recess to receive cylindrical shaped magnet). In the context of such an example mounting configuration, FIGS. 7A and 7B show that due to the generally symmetric magnetic field, azimuthal orientation of the magnet 106 with respect to the magnetization axis (parallel to Z-axis in FIGS. 7A and 7B) generally does not affect the magnetic field 180 reaching the sensor element (108 in FIG. 5C). For the purpose of showing different azimuthal orientations, an indicator 200 is depicted on the magnet 106.

In some embodiments, the magnet 106 is preferably mounted on the carrier 104 so that the magnet's magnetization axis is substantially along the Z-axis, and thus perpendicular to both X and Y axes. Due to various reasons, however, the magnetization axis may deviate from the Z-axis; and examples of such deviations are depicted in FIGS. 8A and 8B.

Figure 8A:
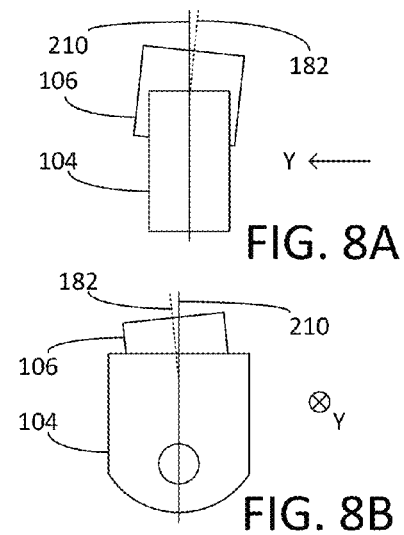
FIGS. 8A and 8B show that the example magnet orientation of FIG. 5 can also provide reduced sensitivity to misalignments of the magnet along lateral directions.
Figure 8B:
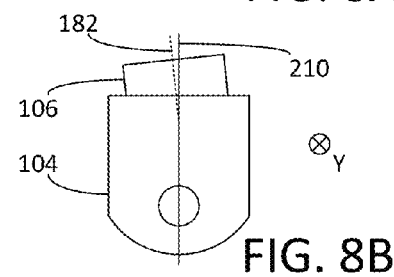

In FIG. 8A, a side view of the magnet-carrier assembly shows that the mounted magnet's axis 182 deviates from the Z-axis (indicated as 210) to result in the magnet 106 being tilted along the Y direction. In FIG. 8B, an end view of the magnet-carrier assembly shows that the mounted magnet's axis 182 deviates from the Z-axis (indicated as 210) to result in the magnet 106 being tilted along the X direction. In some situations, the magnet 106 can be tilted so as to yield a combination of X and Y tilts of FIGS. 8A and 8B.

Figure 6A:
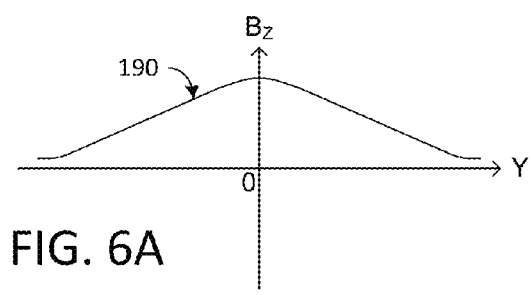
FIGS. 6A and 6B show example distributions of magnetic field strengths for the configuration of FIG. 5.
Figure 6B:
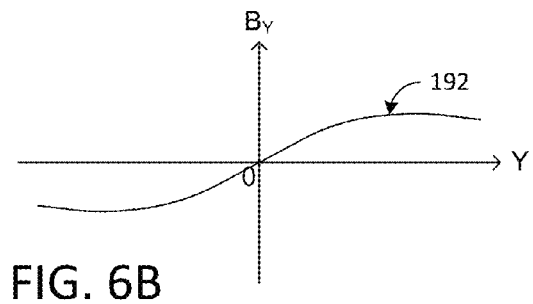

If the magnet 106 is tilted in the foregoing manner, the magnetic field patterns may deviate from the ideal pattern depicted in FIGS. 6A and 6B. Because the $B_Z$ component is relatively large compared to the $B_Y$ component, and because the deviation angle (relative to Z-axis) is relatively small, the net effect on $B_Z$ can be relatively small. Further, even if there are significant deviations in $B_Z$ and/or $B_Y$ components, programmability in some embodiments as described herein can account for such deviations and thus make the output even less sensitive to magnet orientation.

Figure 9:
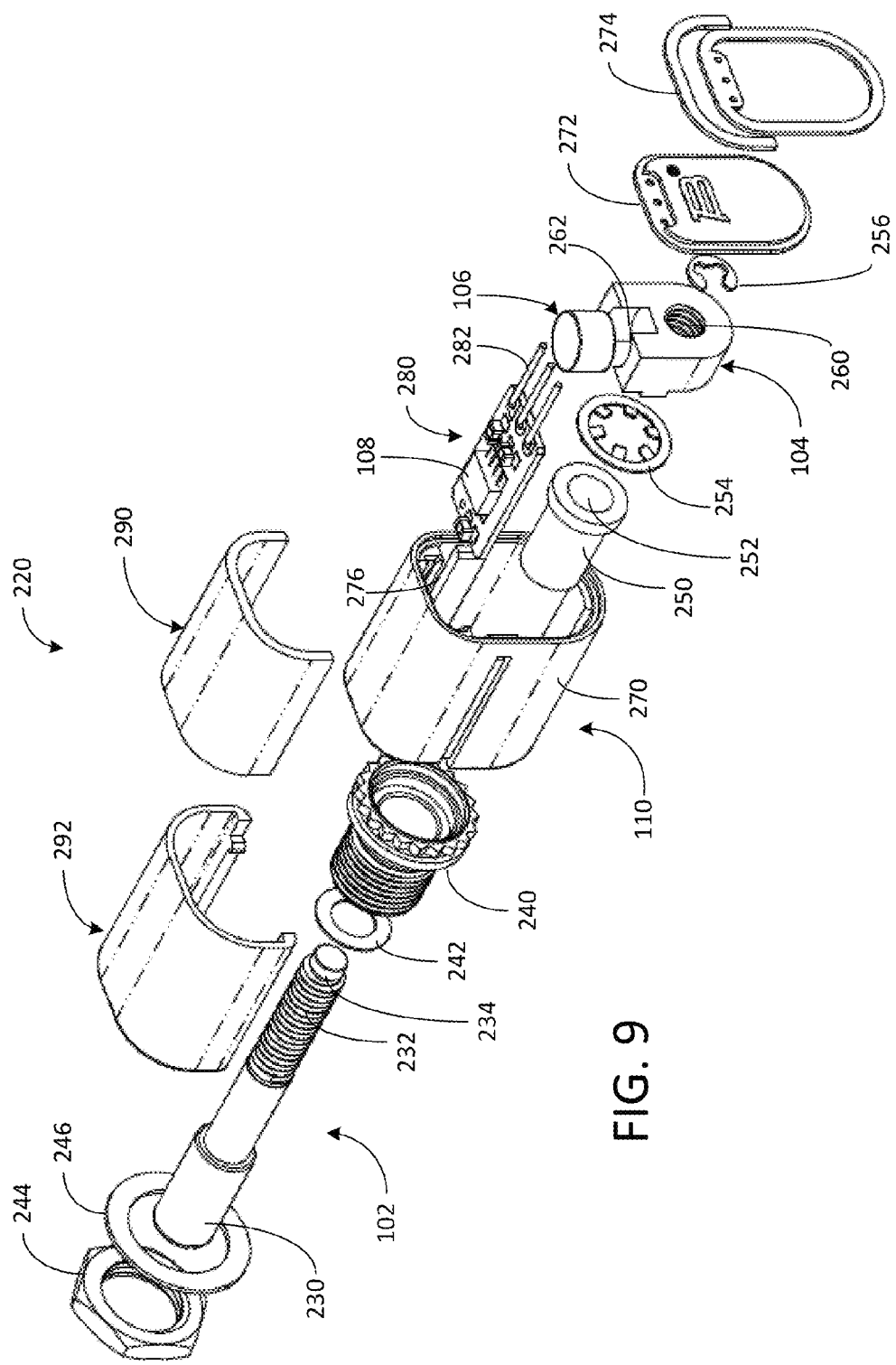
FIG. 9 show an exploded view of an example embodiment of the rotation sensor of FIG. 2.
Figure 10A:
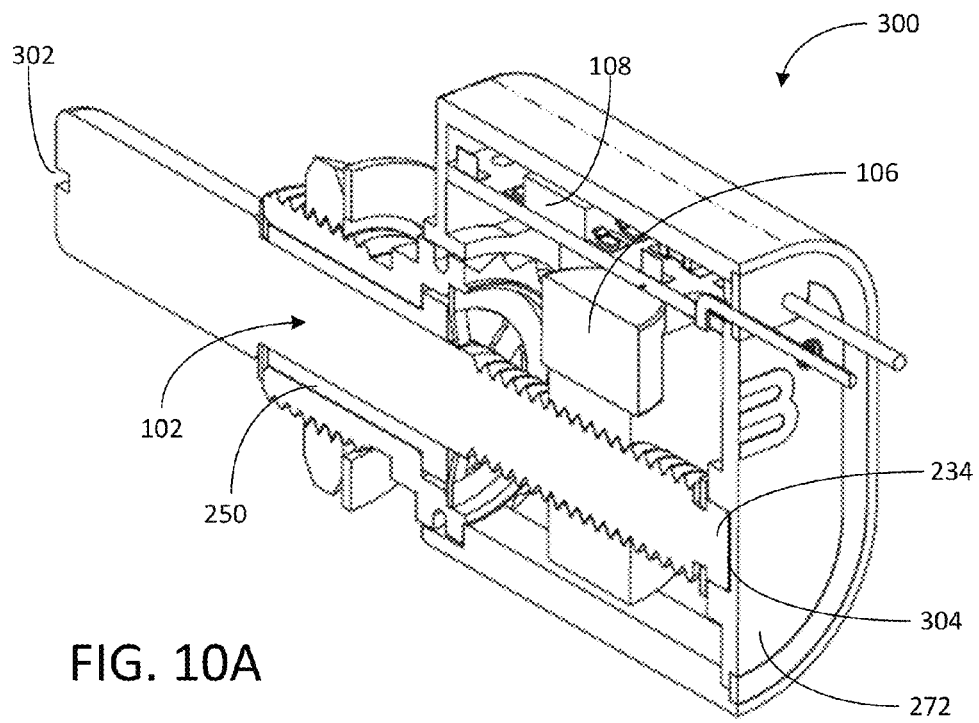
FIG. 10A shows a cutaway perspective view of the rotation sensor of FIG. 9.
Figure 10B:
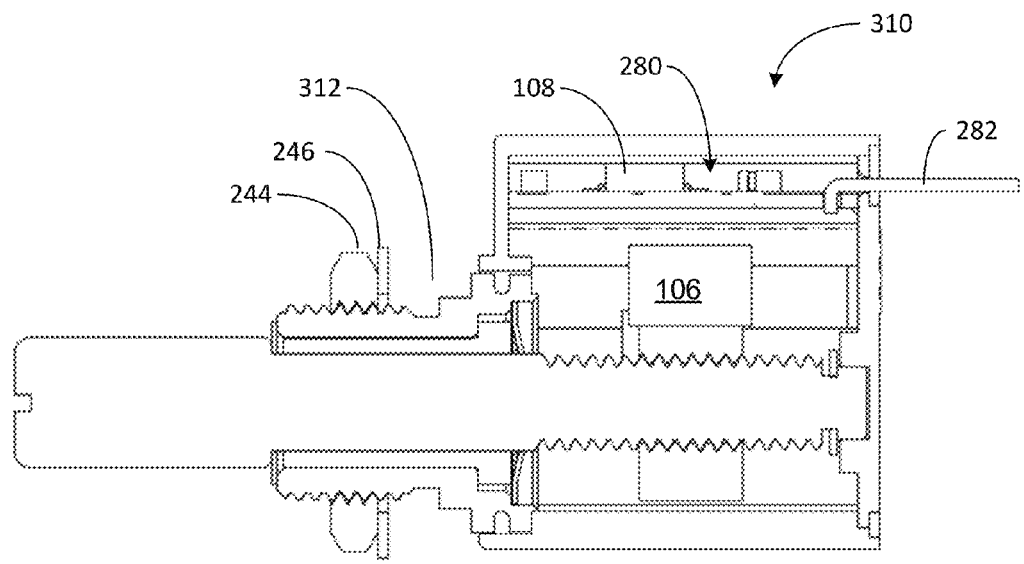
FIG. 10B shows a cutaway side view of the rotation sensor of FIG. 9.
Figure 11:
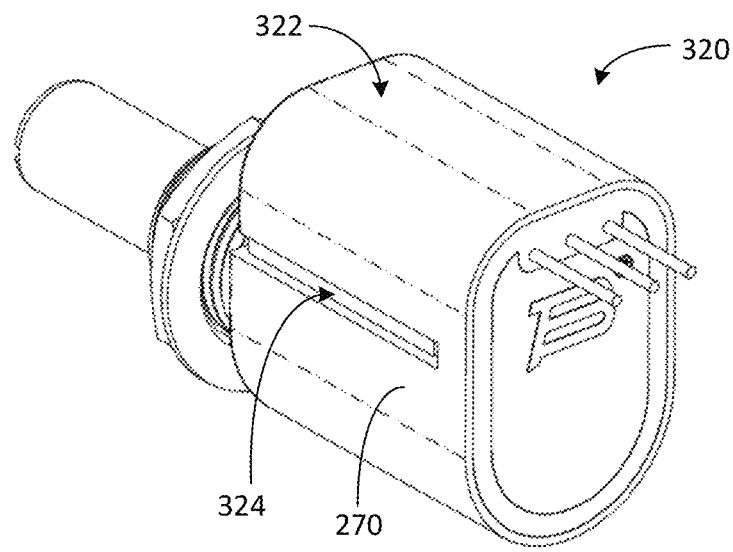
FIG. 11 shows an assembled perspective view of the rotation sensor of FIG. 9.

FIGS. 9-11 show various views of an example configuration of the rotation sensor 100. FIG. 9 shows an exploded view 220; FIG. 10A shows an assembled cutaway perspective view 300; FIG. 10B shows an assembled cutaway side view 310; and FIG. 11 shows an assembled perspective view 320.

As shown, the shaft 102 includes a first end 230 configured to facilitate transfer of torque to the shaft 102 from an external component (not shown). In the example shown, the first end 230 defines a slot 302 (FIG. 10A) for such a purpose. It will be understood that a number of different configurations are possible.

The shaft 102 also includes a second end 232 configured to couple with the carrier 104. In the example shown, the second end 232 of the shaft 102 and a matching aperture 260 of the carrier 104 define matching thread patterns that facilitate translational motion of the carrier 104 in response to rotation of the shaft 102.

The second end 232 of the shaft 102 is shown to be dimensioned to receive a retaining clip 256 for limiting travel of the carrier 104. The second end 232 is also shown to include a tip 234 (FIG. 10A) dimensioned to be received by a similarly dimensioned recess 304 defined by an end cap 272 so as to constrain the second end 232 of the shaft.

In the example shown, a portion between the first and second ends (230, 232) of the shaft 102 is dimensioned to be supported within an aperture 252 defined by a sleeve 250. The sleeve 250 in turn is dimensioned to be secured to the housing 110 via a bushing 240 and a washer 254. Thus, supports of the shaft 102 by the sleeve 250 and the recess 304 of the end cap 274 allow the shaft to rotate with relative precision with respect to the housing 110. Further, longitudinal motion of the shaft 102 with respect to the bushing 240 (and thus the housing 110) is inhibited by a retaining washer 242 and the washer 254.

In some embodiments, the bushing 240 can include external screw threads that mate with a mounting nut 244 to allow mounting of the sensor assembly. As shown in FIG. 10B, the thread pattern on the bushing can be selected to provide an adjustable space 312 between the mounting nut 244 and the housing to facilitate mounting to various dimensioned structures such as plates. A washer 246 can further facilitate such mounting.

In some situations, it may be desirable to have the overall shape of the sensor assembly to be in certain form. For example, a design may call for a rounded form of housing (when viewed longitudinally). More particularly, a design preference may call for a circular shaped housing with respect to the longitudinal axis of the shaft. However, if the interior of the housing is circularly shaped and the carrier is shaped circularly also with the shaft extending through the carrier's center, the carrier's rotational tendency (in response to the shaft rotation) may not be inhibited in absence of some rotation-inhibiting features.

Thus, in some embodiments, a side wall 207 of the housing 110 can be shaped in a "U" shape (when viewed longitudinally), and the carrier can be shaped accordingly. In some embodiments, the curved portion of the "U" can be substantially semi-circular in shape, and the longitudinal axis of the shaft 102 can be positioned at the center of a circle that would be formed by two of such semi-circles. Such a configuration can accommodate at least some of the aforementioned circular design preference. In some embodiments, the sides of the "U" can extend upward so as to inhibit the rotational tendency of the carrier 104.

In some embodiments, the top portion of the "U" shaped side wall 207 can be generally flat so as to accommodate a circuit assembly 280 that can be formed on a flat circuit board. In the example shown, the circuit assembly 280 can be formed as a substantially complete unit on a printed circuit board that is dimensioned to slide into grooves 276 formed near the top portion of the side wall 270.

In some embodiments, as shown in FIG. 9, the example carrier 104 can also have a "U" shape to fit into the side wall 270 and slide longitudinally therein in response to the rotation of the shaft 102. Similar to the side wall 270, the top portion of the carrier 104 can be generally flat so as to accommodate the flat shaped circuit assembly 280. The height of the carrier's "U" shape can be selected so as to allow mounting of the magnet 106 thereon (via the recess 262) at a desired Z distance (see the example coordinate system in FIG. 3B) from the sensing element 108.

As shown, the circuit assembly 280 can include one or more electrical contacts 282, and such contacts can be allowed to extend out of the housing 110 through appropriately formed holes on the end cap 272. In some embodiments, a sealing member 274 can be provided so as to facilitate assembly of the rotational sensor device, as well as provide at least some sealing functionality for various components inside of the housing 110. Such sealing member can include a gasket, an epoxy, or some combination thereof.

FIG. 11 shows an assembled perspective view 320 of the rotational position sensor. One can see that the example configurations and arrangements of various components as described herein allow the rotational position sensor to provide magnetic field sensing functionality in a relatively simple and compact packaging while satisfying certain design criteria.

Figure 12A:
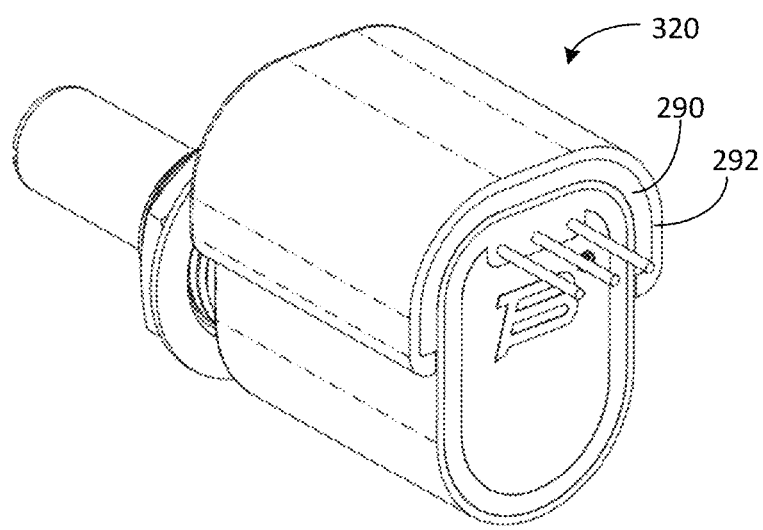
FIG. 12A shows that in some embodiments, a shield can be provided for the rotation sensor of FIG. 11.

In some embodiments, as shown in FIGS. 11 and 12A, the side wall 270 of the housing can include slots 324 dimensioned to facilitate easy mounting and removal of a shield 290. In some situations, the rotational position sensor can be subjected to external electric and/or magnetic fields, and/or radiation.

Because the sensor element 108 operates by sensing magnetic fields, it is desirable to limit magnetic fields to those from the magnet 106 for accurate measurements. Thus, in some embodiments, the shield 290 can be formed of material that has relatively high magnetic permeability. For example, metal alloys such as Permalloys and Mu-metals can be used to form the shield 290.

As shown, the shield 290 can be shaped to substantially conform to the upper portion 322 of the side wall 270. In some embodiments, a cover 292 can be dimensioned to have its edges slide into the slots 324 and sandwich the shield 290 between the cover 292 and the upper portion 322 of the side wall 270. In some embodiments, the cover 292 can be formed relatively easily from plastic to accommodate its shape that is more complex than the shield 290 (to fit into the slots 324).

In some operating conditions, the rotational position sensor may be subjected to radiation such as X-ray, gamma radiation, energetic charged particles, neutrons, and/or other ionizing radiations. Such radiation can have detrimental effects on one or more parts of the rotational sensor, especially upon prolonged exposure. For example, in embodiments where the sensor element 108 is formed from or based on semiconductor materials and/or components, exposure to radiation can degrade the sensing performance.

Figure 12B:
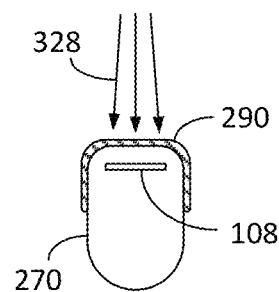
FIG. 12B shows an example situation where an internal component such as the sensing element of the rotation sensor can be shielded by the example shield of FIG. 12A.

FIG. 12B shows that in some embodiments, the example shield 290 can provide effective shielding of the sensor element 108 from radiation 328 without having to fully enclose the housing 270. In common situations where the general direction of radiation 328 is known, the rotational position sensor can be oriented so that the shield 290 covers the sensor element 108 and/or other component(s) from the radiation so as to reduce their exposure.

For example, suppose that a rotational position sensor is being used to monitor the position of a movable patient platform for a radiation based treatment or imaging device. Many of such platforms are moved via jackscrews, and monitoring of the rotation of such jackscrews (by the rotational position sensor) can provide information about the platform position. In such controlled clinical situations, direction and amount of radiation associated with the treatment or imaging device are generally well known. Thus, the rotational position sensor (with a shield) can be oriented so as to provide shielding effect from the radiation.

In some embodiments, the radiation shield 290 can be formed from and dimensioned to provide shielding effect from particular radiation by attenuating intensity of such radiation. Materials such as lead having heavy nuclei can be suitable for shielding X-ray and gamma radiation; whereas low density materials such as plastic or acrylic glass can be suitable for energetic electrons. Other materials for other types of radiations are also possible.

As described herein, use of such easily installable and removable shields can provide an advantageous feature in the context of radiation safety. Because the internal components are shielded from performance degrading radiation, the rotational position sensor can have a longer service life. In the event that the shield needs to be replaced due to its own activated radiation from prolonged exposure, the shield can be replaced relatively easily; and the radioactive shield can be stored or disposed of safely easily due to its relatively small size and simple form.

FIGS. 13A-13F show various non-limiting examples of the housing 270 that can be used as part of the rotational position sensor. Also shown are non-limiting example configurations of the shield 290 having one or more features as described herein.

Figure 13A:
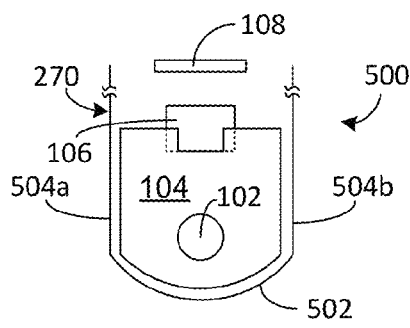
FIGS. 13A-13F show various non-limiting examples of housing shapes and shield shapes that can be implemented.

FIG. 13A shows an example housing configuration 500, where the housing 270 includes a curved wall 502, and first and second walls 504a, 504b that extend from the curved wall 502 so as to form a "U" shaped wall. Examples of advantageous features that can be provided by U-shaped walls are described herein in reference to FIGS. 9 and 10.

FIG. 13A further shows that in some embodiments, the carrier 104 can be shaped to generally conform to and move longitudinally relative to the interior of the U-shaped wall. Various features of the carrier 104 (e.g., coupling with the shaft 102, and holding of the magnet 106 so as to allow longitudinal movement relative to the sensor element 108) are described herein.

Figure 13B:
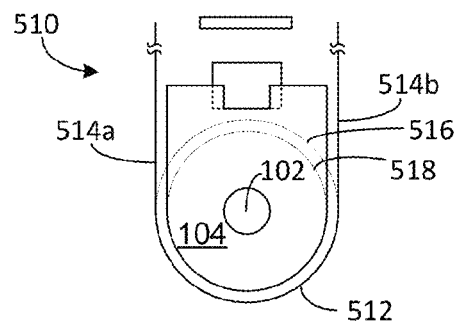

FIG. 13B shows that the curved wall can be defined by a portion of a circle 516. For example, in an example housing configuration 510, the curved wall can be defined by a semi-circle 512 that is part of the shown circle 516. In some embodiments, the portion of the circle defining the curved wall can be an arc that extends more or less than approximately 180 degrees associated with the semi-circle. In the example shown in FIG. 13B, the center of the circle 516 that defines the semi-circle wall 512 can be substantially concentric with the center of the shaft 102.

As further shown in FIG. 13B, first and second walls 514a, 514b can extend from the semi-circular wall 512 so as to form a U-shaped wall of the housing 270. In some embodiments, the carrier 104 can be formed so as to substantially conform to the interior of the curved portion of the U-shaped wall. For example, the curved portion of the carrier 104 can be defined by a semicircle that is part of the depicted circle 518 so as to conform to the example semicircle wall 512.

Figure 13C:
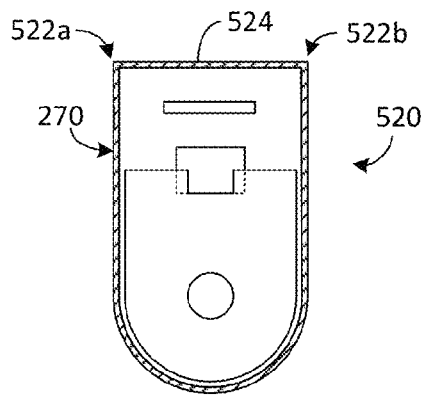
Figure 13D:
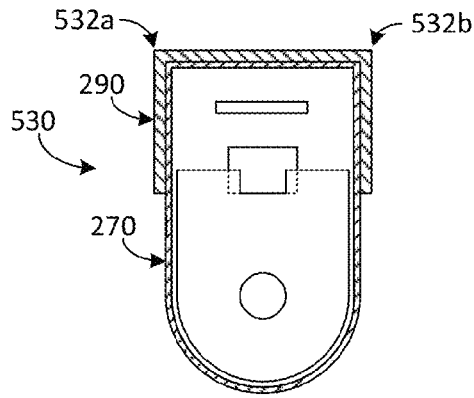
Figure 13E:
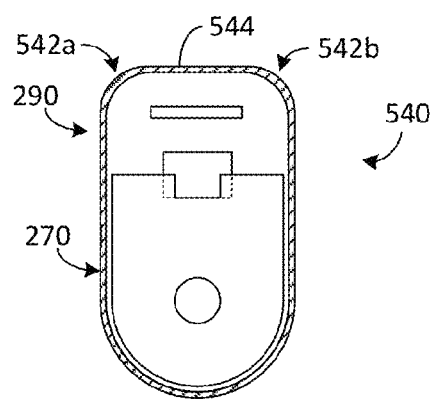

FIGS. 13C and 13E show that the top portion of the U-shaped housing can be configured in a number of different ways. An example configuration 520 of FIG. 13C shows that a cap wall 524 can be coupled with the side walls (e.g., 514a, 514b in FIG. 13B) so as to form substantially square corners indicated as 522a and 522b. Another example configuration 540 of FIG. 13E shows that a cap wall 544 can be coupled with the side walls (e.g., 514a, 514b in FIG. 13B) so as to form rounded corners indicated as 542a and 542b.

Figure 13F:
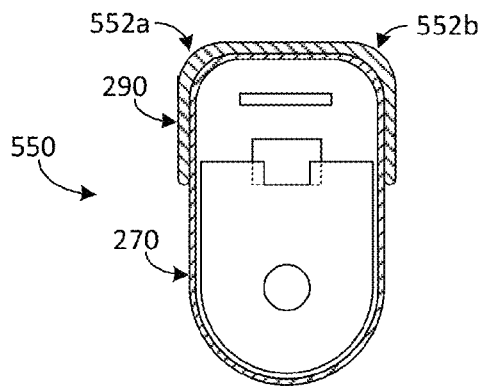

FIGS. 13D and 13F show that the shield 290 having one or more functionalities as described herein can be shaped in a number of ways. An example configuration 530 of FIG. 13D shows that the shield 290 can be shaped to generally conform to the example square-cornered (522a, 522b) top portion of the housing of FIG. 13C, such that the shield 290 includes generally square corners indicated as 532a and 532b. Another example configuration 550 of FIG. 13F shows that the shield 290 can be shaped to generally conform to the example rounded-cornered (542a, 542b) top portion of the housing of FIG. 13E, such that the shield 290 includes rounded corners indicated as 552a and 552b.

For the purpose of description of FIGS. 13A-13F, it will be understood that terms such as "top" and "side" are used in the context of relative positions of different parts associated with the U-shaped wall, and should not be construed to mean that the rotational position sensor as a whole needs to be positioned as such. For clarity, it will be understood that for embodiments of the rotational position sensor having the U-shaped housing, the sensor can be oriented in any manner (e.g., "U" opening up, down, sideway, or any combination thereof) as needed or desired.

Figure 14:
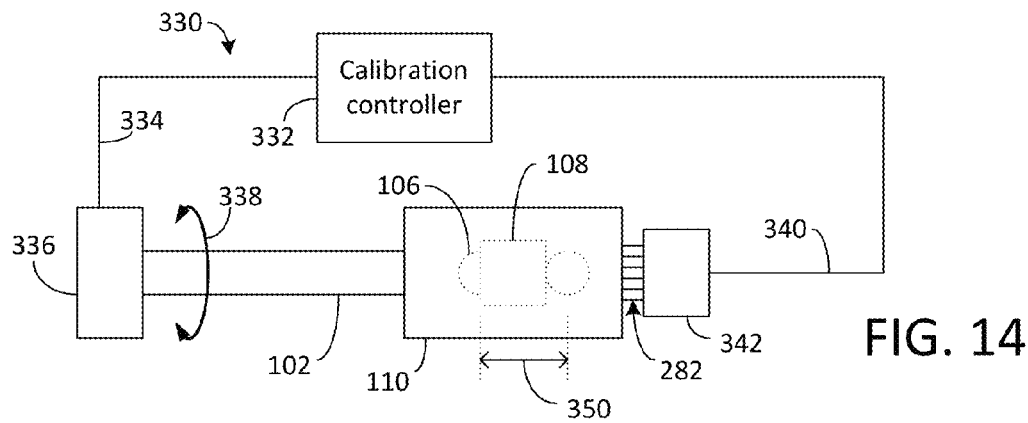
FIG. 14 shows an example configuration for calibrating the rotation sensor.
Figure 15:
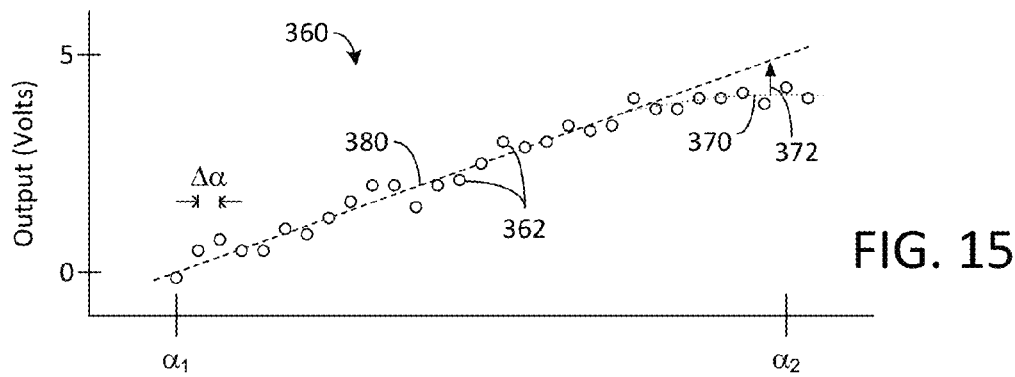
FIG. 15 shows an example of how calibration data can be represented and stored for use during operation of the rotation sensor.

As described herein in reference to FIG. 4, some embodiments of the rotational position sensor 100 can include a programmable functionality with respect to, for example, calibration and operating dynamic range of the sensor 100. FIGS. 14 and 15 show examples of such programmability.

In FIG. 14, a calibration system 330 can include a controller 332 in communication (depicted as line 334) with an actuator 336 so as to allow controlled rotation (arrow 338) of the shaft 102. In response to the controlled rotations (e.g., in steps), the magnet 106 is depicted as moving relative to the sensor element 108 in a selected longitudinal motion range (depicted as 350) within the housing 110. At each of the controlled magnet positions, an output signal can be collected through the contacts 282 via a connector 342, and such signal can be provided (line 340) to the controller 332 for processing.

The calibration data 360 obtained in the foregoing manner can be represented in a number of ways. As shown in an example representation 360 in FIG. 15, a relationship between an output such as voltage and an input such as an angular position $\alpha$ can be obtained. For a plurality of calibration data points 362 obtained at a number of angular positions (e.g., obtained in increments of $\Delta\alpha$), a curve such as a linear line 380 can be fit to represent a relationship between the output voltage and the input angular position. Fitting of such representative curve can be achieved in a number of ways that are generally known.

In some situations, some portion(s) of the calibration data points may deviate systematically from a representative curve. For example, data points near the upper limit of the angular position $\alpha$ are depicted as deviating from the linear line 380 (representative of the main portion of the angular range). Such deviation can occur due to a number of reasons. For the purpose of description, the systematic deviation is shown as being represented by a deviation curve 370.

In some embodiments, one or more corrections can be made so as to adjust an output so as to yield a desired output representation. For example, the systematic deviation 370 can be adjusted (arrow 372) such that the output voltage can be represented as a substantially linear relationship within a defined range of the angular position $\alpha$.

In some embodiments, information about the calibrated input-to-output relationship can be stored so as to be retrievable during operation of the rotational position sensor 100. For example, such information can be stored in the memory component 150 of FIG. 4 in one of a number of formats, including, a lookup table, one or more parameters (e.g., slope and intercept parameters if linear relationship is used) for an algorithm representative of the relationship, etc.

Figure 16:
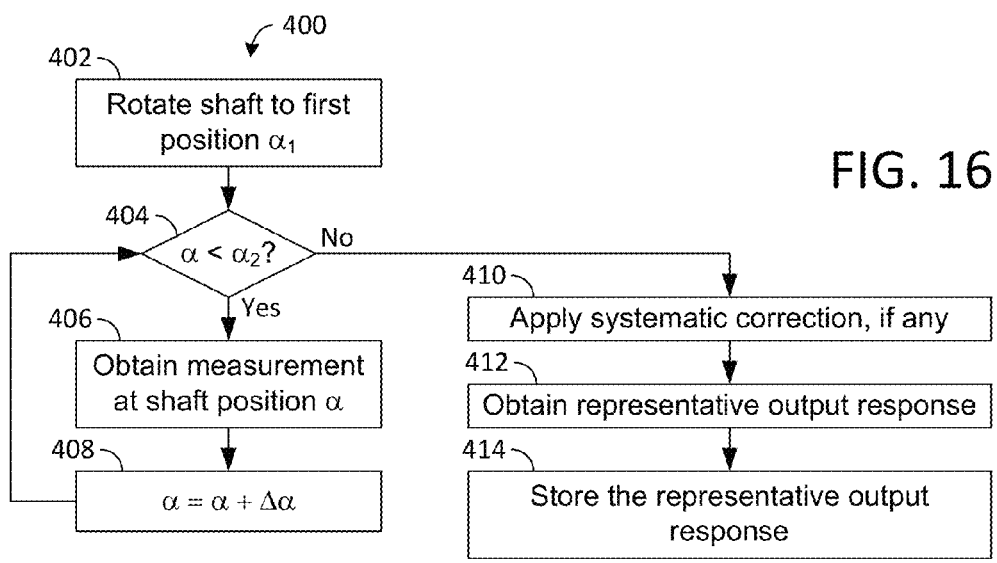
FIG. 16 shows an example calibration process that can be implemented.
Figure 17:
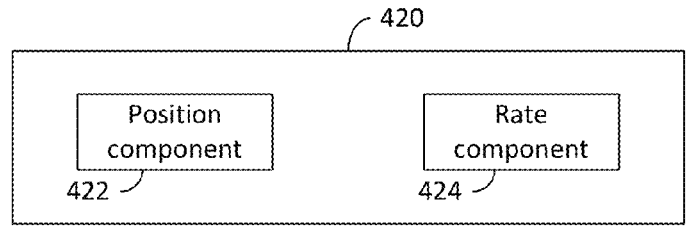
FIG. 17 shows that in some embodiments, the rotation sensor can include a rate component configured to calculate, for example, rotational rate based on sensed angular positions.

FIG. 16 shows an example process 400 that can be implemented to achieve one or more features of the calibration process described in reference to FIGS. 14 and 15. In a process block 402, the shaft of the angular position sensor 100 can be rotated to a first position ($\alpha_1$) representative of a first limit (e.g., lower limit) of a desired range of rotational motion. The process 400 then can enter an iterative sequence where measurements are taken at incremental steps. Thus, in a decision block 404, the process 400 determines whether the current angular position $\alpha$ is less than a second position ($\alpha_2$) representative of a second limit (e.g., upper limit) of the desired range of rotational motion. If the answer is "Yes," the process 400 continues with another iteration of measurement. In a process block 406, a calibration measurement can be obtained at the current shaft position $\alpha$. In a process block 408, the shaft position can be incrementally changed by $\Delta\alpha$, and the process 400 can perform the test of the decision block 404 with the updated angular position.

If the answer in the decision block 404 is "No," a systematic correction (if any) can optionally be applied in a process block 410. In a process block 412, a representative output response (e.g., a linear output response) can be obtained. In a process block 414, information about the representative output response can be stored so as to allow retrieval and use during operation of the angular position sensor 100.

In some embodiments, the calibration feature can include a locking feature to inhibit unauthorized calibration and/or altering of the information about the output response. In some situations, such locking can occur after a calibration process performed at an authorized facility such as a fabrication facility.

In some situations, it may be desirable to provide at least some capability for adjustments, customizations, and the like after locking of the calibration feature and/or calibration information. In some embodiments, the calibration feature can further include a key (e.g., an electronic key) that allows an authorized party to unlock at least some of such functionalities. Locking, unlocking, and related operations for the foregoing can be achieved in known manners.

In the foregoing description in reference to FIGS. 14-16, a linear relationship between an output and an input is described as being one of a number of possible relationships. In some embodiments, such linear relationship can arise from a translational position of the magnet relative to the sensing element 108.

For example, in some embodiments, the sensing element 108 can be an integrated circuit having capability to detect three components ($B_X$, $B_Y$, $B_Z$) of a magnetic field. Such an integrated circuit (IC) can include, for example, a Hall sensing monolithic sensor IC (model MLX90333) manufactured by Melexis Microelectronic Systems. Additional information about the example IC-based sensor element can be found in various documentations (including an application note) available at the manufacturer's website http://melexis.com.

For sensor elements having capability to detect two or more magnetic field components (such as the example Melexis sensor), a combination of $B_Z$ and a longitudinal component (e.g., $B_Y$) can yield a quantity that has an approximately linear relationship with longitudinal position of the magnet (relative to the sensor element). For example, $\theta = \arctan(B_Y/B_Z)$ ($\theta$ defined as shown in FIG. 5C) can yield an approximately linear response to longitudinal position of the magnet along the Y-axis.

In some embodiments, such an approximately linear relationship between the example quantity $\theta$ and Y position can be extended to obtain an approximately linear relationship between the quantity $\theta$ and angular position ($\alpha$) of the shaft. Such extension of the relationship can be made readily, since the angular position ($\alpha$) of the shaft generally has a linear relationship with translational motion of the magnet carrier coupled via substantially uniform threads.

In some embodiments, the example linear relationship between the angular position ($\alpha$) of the shaft and the magnetic field quantity $\theta$ can be provided with an amplitude parameter that allows selection of a desired output range. For example, the amplitude parameter can be selected so as to yield output values in a range between approximately 0 and 5 volts.

Although the foregoing example is described in the context of a generally linear property that can result from some combination of magnetic field components, it will be understood that such detected quantities do not necessarily need to be linear to begin with. For example, the example $B_Y$ and/or $B_Z$ components described in reference to FIG. 6 can be linearized by applying generally known techniques to calibration data points and/or representative curves.

In some embodiments, an output of the rotational position sensor 100 does not even need to be a linear response to the input rotation. Preferably, however, each angular position of the shaft has a unique corresponding output.

In various examples described herein, an output of the rotational position sensor 100 is sometimes described as being a voltage. It will be understood, however, that the output can be in a number of different forms. The output can be in either digital or analog format, and include but not limited to signals based on pulse width modulation or serial protocol.

In some embodiments, the output of the rotational position sensor 100 can be in a processed format. Such processing can include, for example, amplification and/or analog-to-digital conversion.

In some embodiments, sensing of translational position of the magnet (and thus angular position of the shaft) can allow determination of a rate in which such a position changes. Thus, as depicted schematically in FIG. 17, a sensor system 420 can include a position determination component 422 having features as described herein, and optionally a rate component 424. In some embodiments, the rate component can be configured to determine an average or an approximation of instantaneous rotational speed of the shaft by combining the position measurements as described herein with time information (e.g., sampling period). In some embodiments, such a rate determination can be extended to estimation of angular acceleration of the shaft.

Figure 18A:
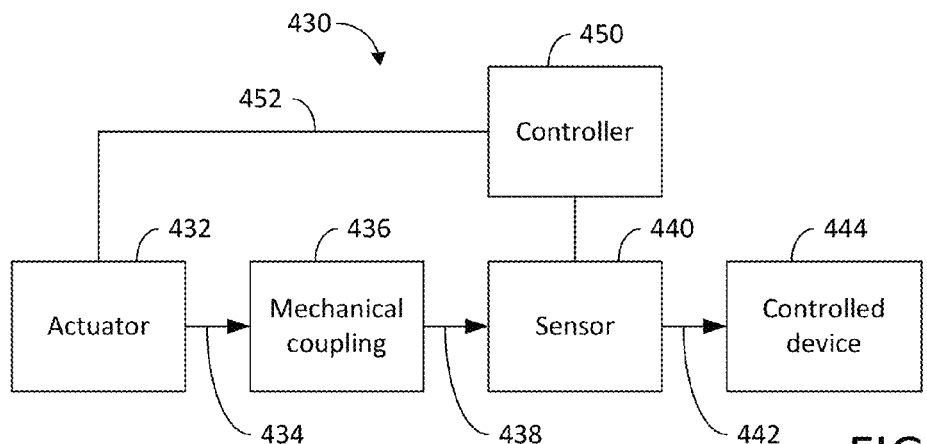
FIGS. 18A and 18B show non-limiting examples of feedback control systems that can be implemented utilizing the rotation sensor.
Figure 18B:
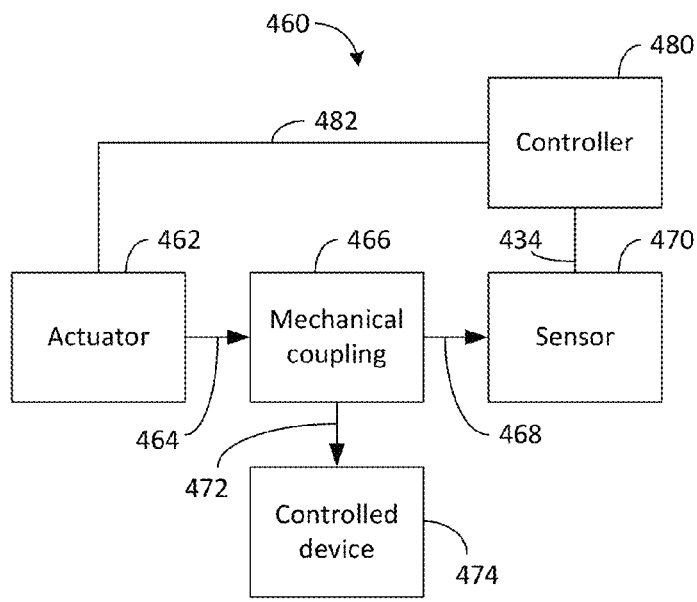

FIGS. 18A and 18B schematically depict non-limiting examples of systems where the rotational position sensor can be used. In one example system 430 shown in FIG. 18A, a rotational position sensor 440 can be disposed between an actuator 432 and a controlled device 444 being mechanically driven by the actuator 432 via a mechanical coupling 436. Thus, mechanical output (arrow 434) of the actuator 432 can be coupled (arrow 438) to the sensor 440 (via, for example, the shaft), and that mechanical actuation can continue through the sensor 440 and be transmitted (arrow 442) to the controlled device 444.

The sensor 440 can operate as described herein so as to facilitate determination of, for example, the rotational state of the mechanical coupling (e.g., rotational position of the shaft). As shown, the sensor 440 can be in communication with a controller 450 configured to control (line 452) the actuator 432 in response to the sensor's output. In some embodiments, such sensing and controlling of the actuator 432 (and thus the controlled device 444) can be configured as a feedback control system.

FIG. 18B shows another example system 460 that can be a variation to the system of FIG. 18A. In the example configuration 460, a mechanical coupling component 466 can be configured to receive mechanical output (arrow 464) from an actuator 462 and provide separate mechanical outputs 472 and 468. The output 472 can be provided to a controlled device 474, and the output 468 can be provided to a sensor 470. Similar to the example system 430 of FIG. 18A, the sensor 470 can provide an output 434 to a controller 480 configured to control (line 482) the actuator 462. Again, such sensing and controlling of the actuator 462 can be configured as a feedback control system.

As described in reference to FIGS. 18A and 18B, the example configuration 430 can be considered to be an inline type monitoring system, and the example configuration 460 can be considered to be a parallel type monitoring system. Other monitoring and/or feedback configurations are also possible.

Figure 19:
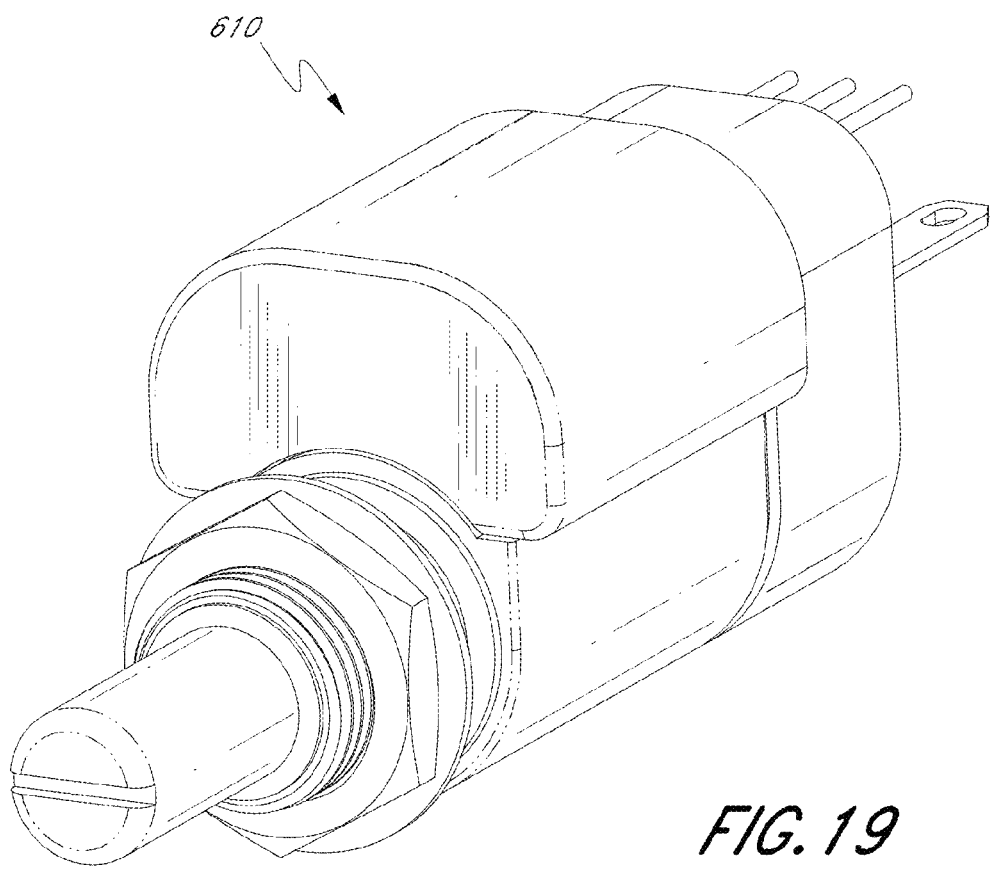
FIG. 19 shows an example of an assembled position sensing device having the angular position sensor component of FIG. 1 and the rotation sensor component having one or more features of FIGS. 2-18.
Figure 20:
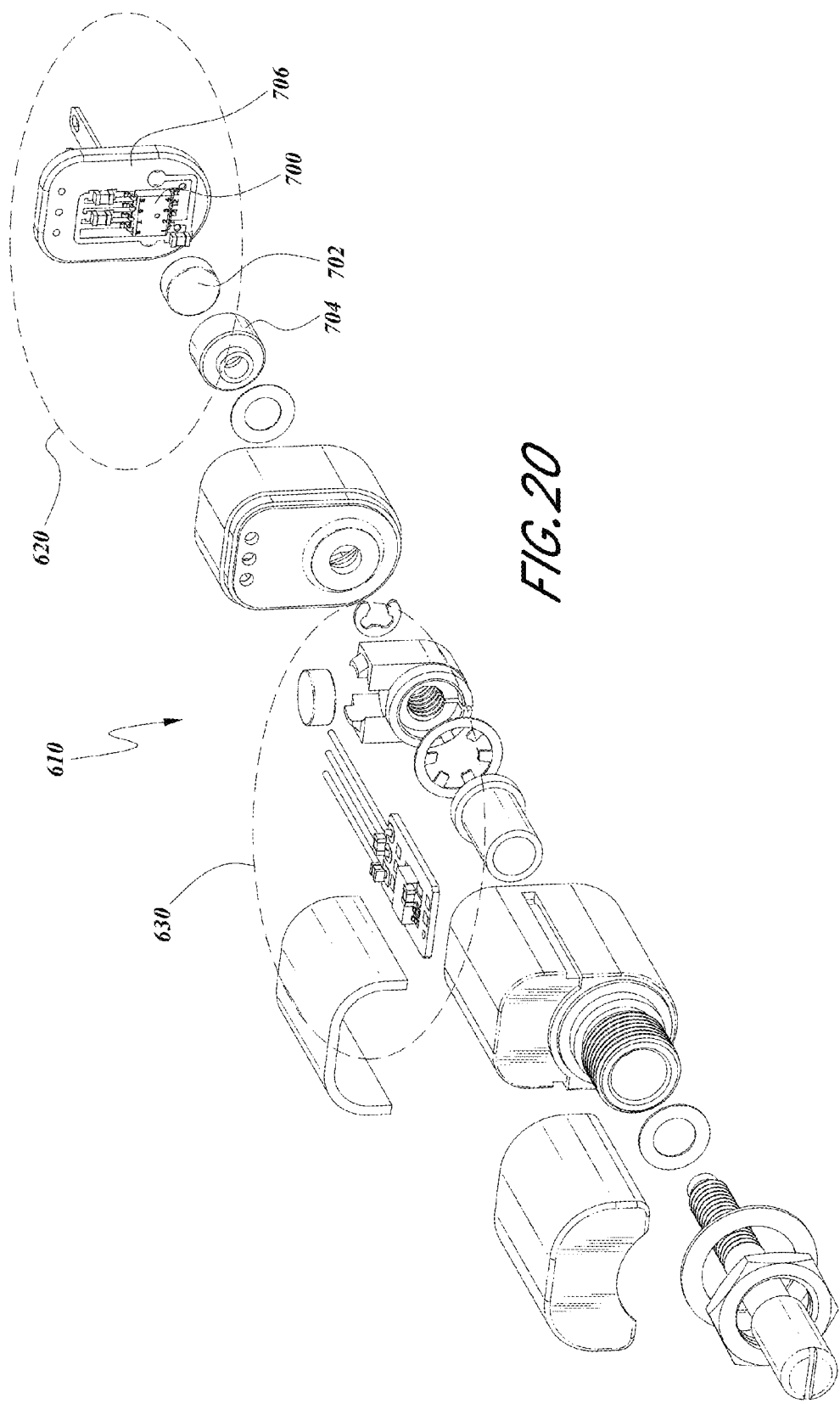
FIG. 20 shows an exploded view of the example position sensing device of FIG. 19.

Although described in the context of the example rotation sensor 100 of FIGS. 2-18, it will be understood that one or more features of the present disclosure can be implemented with other rotation sensor designs. In the example context of the rotation sensor 100 (of FIGS. 2-18), the position sensing device 600 of FIG. 1 can be implemented as a device 610 shown in FIGS. 19-21. FIG. 19 shows an assembled view of the device 610; FIG. 20 shows an exploded view of the device 610; and FIG. 21 shows a cutaway view of the device 610.

As shown in the exploded view of FIG. 20, the rotation sensor 604 of FIG. 1 can be implemented as a sensor assembly 630. Additional details about such a sensor assembly are described herein in reference to FIGS. 2-17.

Figure 21:
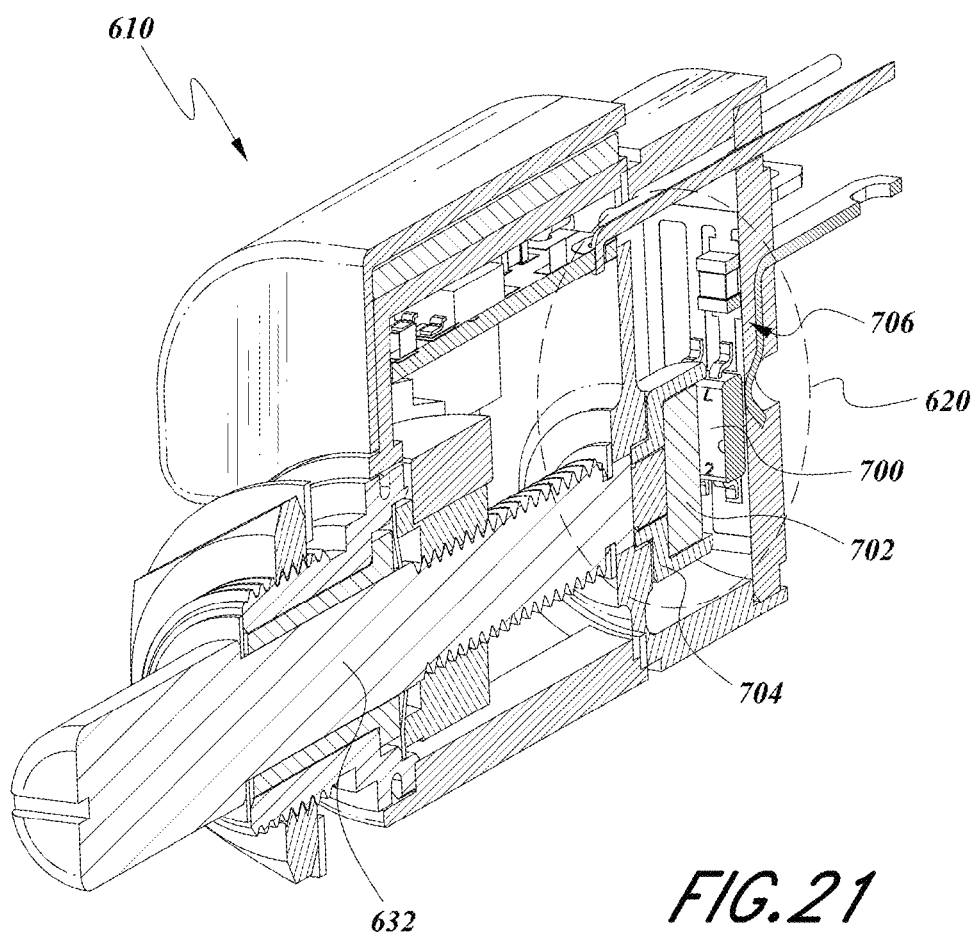
FIG. 21 shows a cutaway view of the example position sensing device of FIG. 19.

FIGS. 20 and 21 show that in some embodiments, the angular position sensor 602 of FIG. 1 can be implemented as a sensor assembly 620. The angular position sensor 620 can include a magnet 702 mounted to a rotatable axis 632 of the device 610 via a mounting member 704. The angular position sensor 620 can further include a magnetic sensor 700 mounted on a circuit board 706. In some embodiments, the angular position sensor 620 can be configured to be a part of an application specific integrated circuit (ASIC). In some embodiments, the magnet 702 and the magnetic sensor 700 can be positioned relative to each other so as to be substantially non-contacting. Additional details and examples associated with the magnet 702 and the magnetic sensor 700 are described herein in greater detail.

Figure 22A:
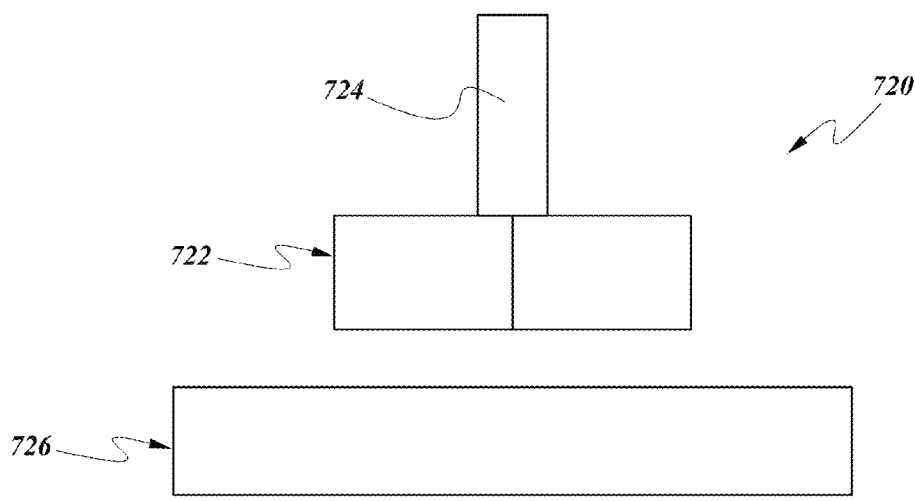
FIGS. 22A and 22B schematically depict side and axial views of an example of the angular position sensor of FIG. 19.
Figure 22B:
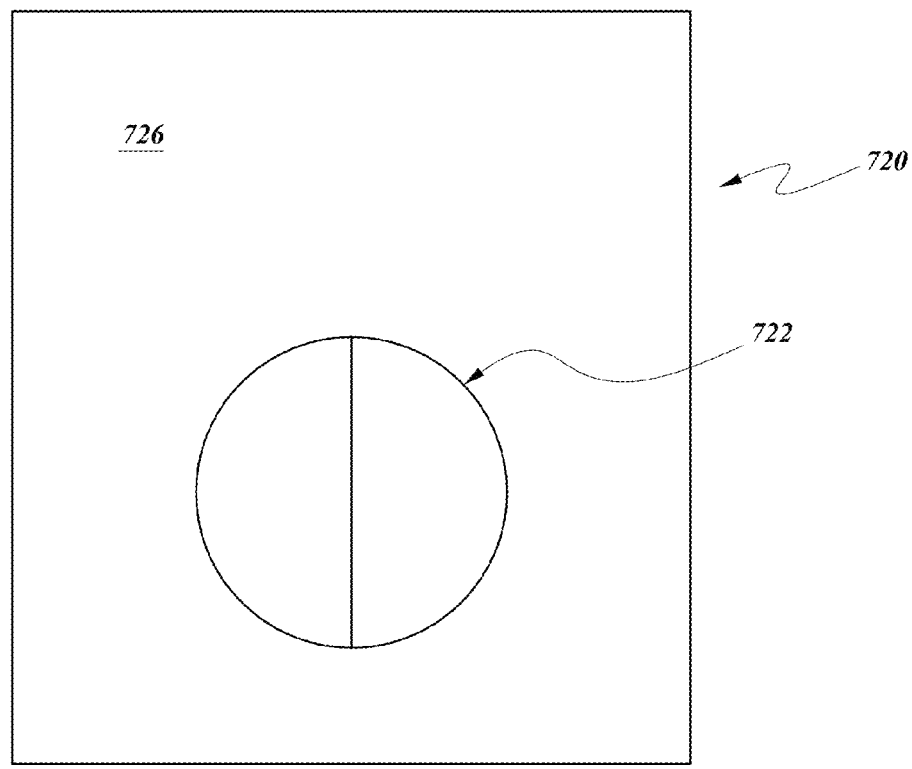

FIGS. 22A and 22B schematically depict isolated side and axial views of an example configuration 720 of a magnet 722 (702 in FIGS. 20 and 21) and its non-contacting position relative to a magnetic sensor 726 (700 in FIGS. 20 and 21). The magnet 722 is shown to be mounted to a rotatable axis 724 (632 in FIG. 21). In FIGS. 22A and 22B, a magnet holder (e.g., 704 in FIGS. 20 and 21) is not shown.

In some embodiments, the magnet 722 can be a bipolar and diametrally magnetized so as to yield variable orthogonal and parallel magnetic fluxes to the magnetic sensor 726. In some embodiments, such a magnet can be separated from the magnetic sensor by, for example, approximately 1 mm±0.5 mm working distance, and the magnetic sensor 726 can be configured to read the angular position of the magnet 722 with 10 to 14 bit resolution. Other separation distances and/or other resolution capabilities can also be utilized.

FIGS. 23A-23D show examples of how such magnetic flux can be detected so as to determine the angular position of the magnet 722 of FIGS. 22A and 22B (and thus the rotatable axis 724) relative to the magnetic sensor 726. In some implementations, the magnetic sensor 726 can include a quadrature Hall-effect sensor assembly 752 having Hall-effect sensors indicated as H1-H4. Such Hall-effect sensors may or may not be formed as integrated sensors. Although the magnetic sensor 726 is described in the context of Hall-effect sensors, it will be understood that other types of sensors can also be implemented. For example, sine-cosine magneto-resistive (MR) sensors or giant magnetic resistive (GMR) sensors can be utilized (e.g., in a bridge configuration).

Figure 23A:
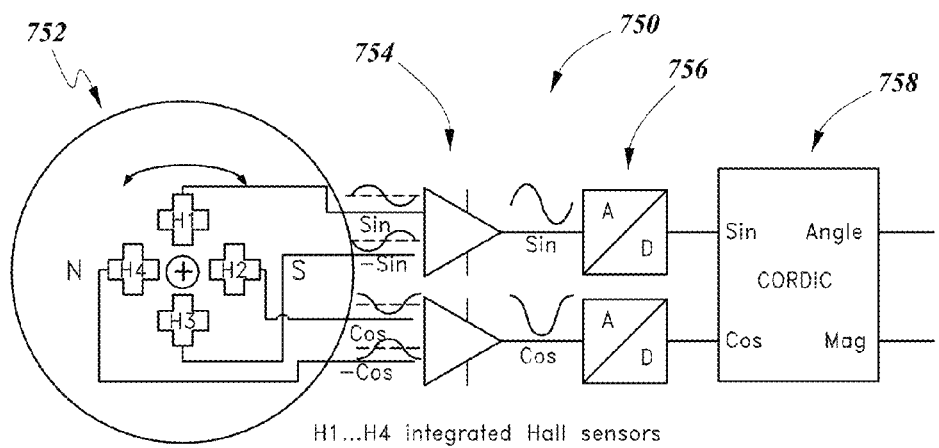
FIGS. 23A-23D show examples of how the angular position sensor can operate to yield an angular position of a rotating axis.

FIG. 23A shows that in some implementations, the magnetic sensor assembly 752 can be configured to operate as a sine-cosine sensor, where the variations of the orthogonal and parallel magnetic fluxes (e.g., 760 in FIG. 23B) at the magnetic sensor assembly 752 can be approximated as sine and cosine in quadrature. Such outputs of the Hall-effect sensors can be processed by an analog interface 750 configured to provide functionalities such as amplification and conditioning (754) and conversion to digital data (756) so as to yield one or more outputs (758). In some embodiments, the back-end portion of the foregoing readout arrangement can be configured so as to provide programmable interface with A/D, D/A and serial communication capabilities.

Figure 23B:
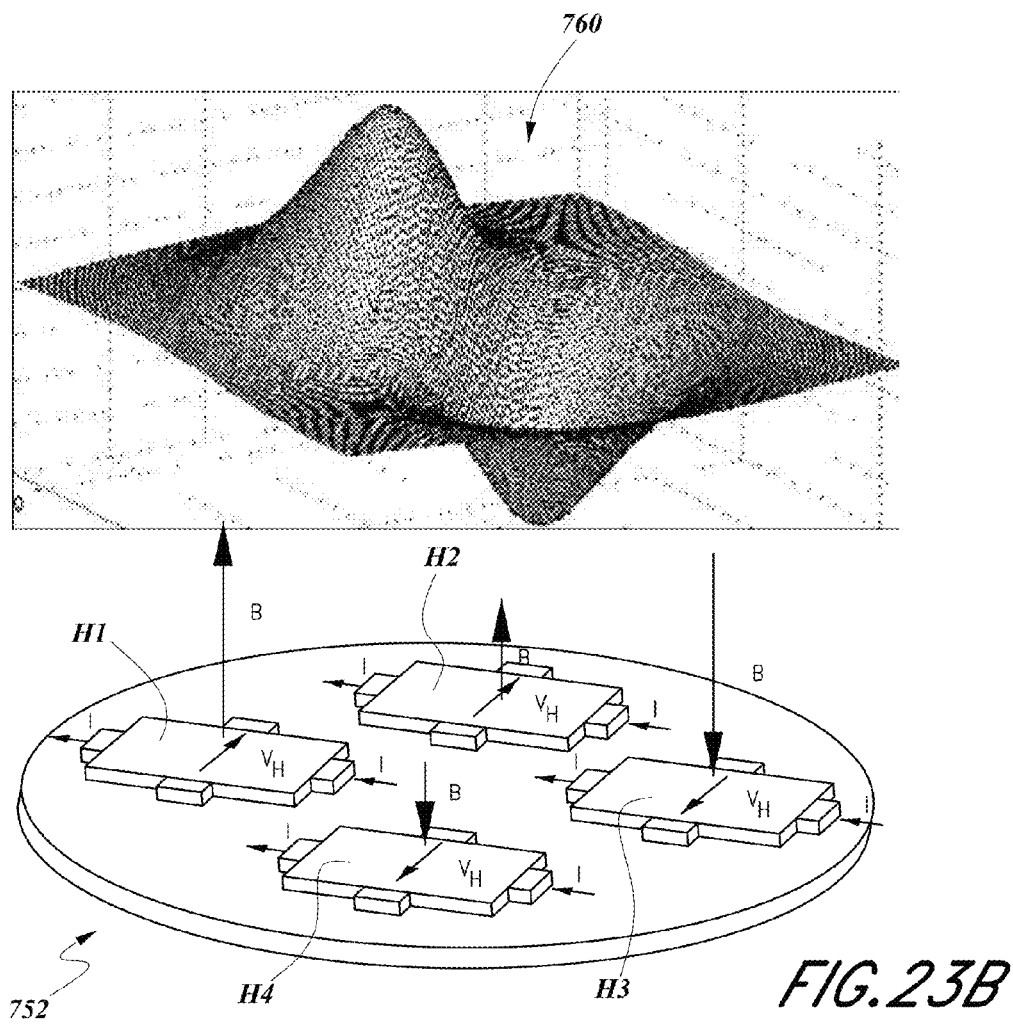

In the example shown in FIGS. 23A and 23B, the Hall-effect sensors H1-H4 are depicted as outputting +sine, +cosine, −sine, −cosine signals, respectively. Such signals can be based on Hall voltages ($V_H$) resulting from interactions of the currents (I) with the magnetic fields (B). Accordingly, sensing of such signals can yield flux values H1-H4 that can be represented as follows:

$$H1 = â·\sin(\alpha) \quad (1a)$$

$$H2 = â·\cos(\alpha) = â·\sin(\alpha+90°) \quad (1b)$$

$$H3 = -â·\sin(\alpha) = â·\sin(\alpha+180°) \quad (1c)$$

$$H4 = -â·\cos(\alpha) = â·\sin(\alpha+270°), \quad (1c)$$

such that:

$$H1-H3 = 2â·\sin(\alpha) \quad (2a)$$

$$H2-H4 = 2â·\cos(\alpha). \quad (2b)$$

Upon differential readouts, the signals can be approximated as sine and cosine signals. Such signals can be used to calculate an angular displacement (A) of the magnet relative to the magnet sensor. For example, the quantity A can be estimated as follows:

$$(H1-H3)/(H2-H4) = (2â·\sin(\alpha))/(2â·\cos(\alpha)) = \tan(\alpha) \quad (3a)$$

$$A \approx \arctan((H1-H3)/(H2-H4)) = \arctan(\tan(\alpha)) = \alpha. \quad (3b)$$

Figure 23C:
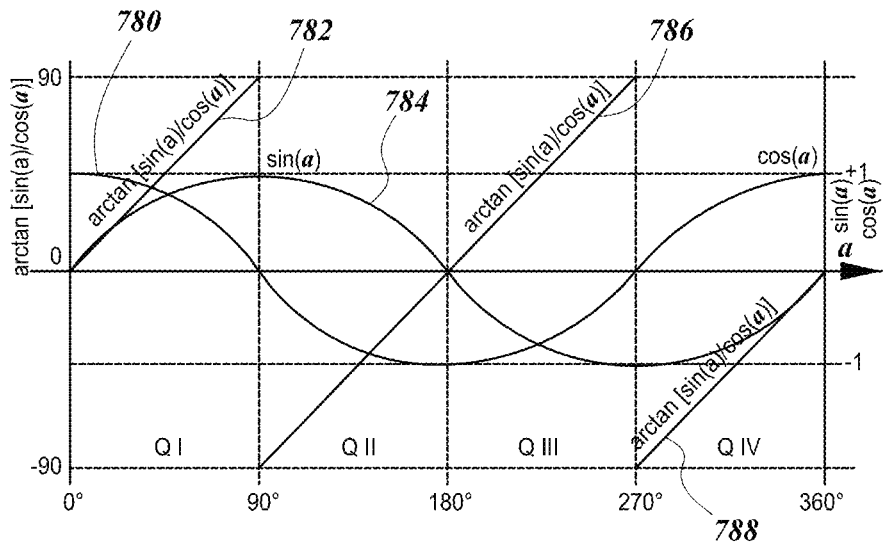

Thus, as shown in FIG. 23C, readouts of sine and cosine signals (784, 780) in quadrature can yield an angular displacement (A) of the magnet that can be estimated as being linear with the phase angle α. Such linear estimation is depicted by sloped lines 782, 786 and 788.

Figure 23D:
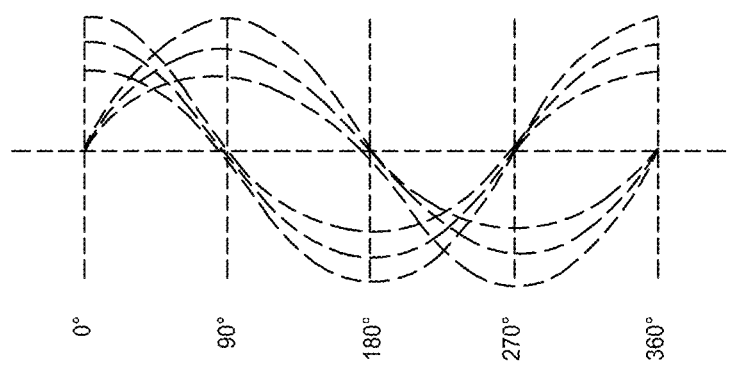

In some situations, the Hall sensors' amplitudes may change due to effects such as mechanical misalignment, internal magnetic field variation, temperature variation, and/or external magnetic fields. However, as shown in FIG. 23D, such effects will likely affect the signals amplitudes and not the sin/cos ratios. Thus, the foregoing example of estimating the angular displacement by the sin/cos ratio or the phase angle α can yield a stable sensor.

Referring to the example device 610 of FIGS. 19-21, suppose that the angular position sensor 620 yield an angular displacement value A as described above in a range of 0 to 360 degrees. Further, suppose that such an angular displacement value A can be measured with a resolution of, for example, 14 bits. In some implementations, fine resolution of the device 610 can be provided by the angular position sensor 620, and the rotation sensor 630 can be configured with relatively low resolution (e.g., 4 bits) to count the number of turns made by the rotatable axis 632. Such a configuration can maintain the per-angle resolution provided by the angular position sensor 620 throughout a full range of rotational motion, which in some situations can involve multiple turns of the rotatable axis 632. Accordingly, the rotation sensor 630 operating as a turn counter, in combination with the high resolution capability of the angular position sensor 620, can yield a high resolution position sensing device over a wide range of rotational motion.

In the foregoing example where the angular position sensor 620 is configured to provide a 14-bit resolution and the rotation sensor 630 is configured to provide a 4-bit capability, the rotation sensor 630 is capable of determining the number of turns from 0 to 15. Within each turn, the angular position sensor 620 can provide an angular resolution of about 0.02 degree (360/(214)). Because the rotation sensor 630** is providing the turn number information, angular position in any of the turns within the range of 0 to 15 can benefit from the 0.02 degree resolution. Accordingly, the angular resolution for the entire range of motion remains at 0.02 degree, effectively yielding an 18-bit angular resolution over a range of 0 to 15 turns, inclusive.

If the angular position sensor 620 is not used, then the angular resolution of the device 610 can depend on the rotation sensor 630 operating in the linear-position sensing mode (as described in reference to FIGS. 2-18). In such a mode, increasing the number of turns can involve increasing the bit resolution to maintain a given angular resolution.

Thus, as described herein, combination of an angular position sensor (e.g., 620) and a rotation sensor (e.g., 630) configured to include turn counting capability can yield a device having a high angular resolution over multiple turns. It will be understood that one or more concepts described herein can be implemented in other configurations. For example, counting of turns can be provided by some other sensing device. Further, angular displacement can be measured by using one or more other techniques.

In some embodiments, some or all of various features such as shielding, housing, and/or calibration associated with the rotation sensor described in reference to FIGS. 2-18 can be implemented in the position sensing device 610 described in reference to FIGS. 19-21.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A position sensing device, comprising:
a rotatable shaft having a longitudinal axis;
a first sensor assembly having a first magnet and a first magnetic sensor, the first sensor assembly configured to allow measurement of linear position of the first magnet relative to the first magnetic sensor so as to allow determination of a number of turns of the shaft; and
a second sensor assembly having a second magnet and a second magnetic sensor, the second magnet positioned at an end of the shaft along the longitudinal axis, the second sensor assembly configured to allow measurement of angular position of the second magnet relative to the second magnetic sensor so as to allow determination of angular position of the shaft within a given turn of the shaft, such that an angular resolution associated with the angular position of the shaft is substantially maintained throughout the number of turns of the shaft.

2. The device of claim 1, wherein the linear position of the first magnet is along a linear direction having a component substantially parallel to the longitudinal axis.

3. The device of claim 2, further comprising a first mechanism configured to couple the first sensor assembly to the shaft such that rotation of the shaft about the longitudinal axis results in linear motion of the first magnet along the linear direction.

4. The device of claim 1, wherein the second magnet is mounted directly to the end of the shaft.

5. The device of claim 1, wherein the second magnet is mounted to the end of the shaft by a magnet holder configured to hold the second magnet and interconnect the second magnet to the end of the shaft.

6. The device of claim 1, wherein the second magnet is coupled to the end of the shaft so that one turn of the shaft results one turn of the second magnet.

7. The device of claim 1, wherein the second magnet is positioned so as to be non-contacting with the second magnetic sensor.

8. The device of claim 7, wherein the second magnet includes a bipolar and diametrally magnetized magnet configured to provide variable orthogonal and parallel magnetic fluxes to the second magnetic sensor.

9. The device of claim 1, wherein the second magnetic sensor is configured to operate in quadrature mode, the second magnetic sensor including a plurality of Hall-effect sensors, a plurality of magneto-resistive (MR) sensors, or a plurality of giant magnetic resistive (GMR) sensors.

10. The device of claim 9, wherein the second magnetic sensor includes four sensors positioned in quadrature and configured to operate as sine-cosine sensors.

11. The device of claim 9, further comprising an analog interface configured to process output signals from the second magnetic sensor and yield digital data.

12. The device of claim 11, wherein the digital data includes information about the angular position of the shaft with a resolution of at least 10 bits for the given turn of the shaft.

13. The device of claim 12, wherein the angular position of the shaft has a resolution in a range of 10 bits to 14 bits for the given turn of the shaft.

14. The device of claim 9, wherein the second magnetic sensor and the analog interface are parts of, or disposed on, an application specific integrated circuit (ASIC).

15. The device of claim 1, wherein the first sensor assembly is configured to provide an M-bit resolution sufficient to count the number of turns, and the second sensor assembly is configured to provide an N-bit resolution to yield the angular resolution, such that the position sensing device has an effective M+N bit resolution over the number of turns.

* * * * *